United States Patent
Tsurumi et al.

(10) Patent No.: US 9,865,068 B2
(45) Date of Patent: Jan. 9, 2018

(54) IMAGE PROCESSING DEVICE, AND IMAGE PROCESING METHOD

(75) Inventors: Shingo Tsurumi, Saitama (JP);
Shunsuke Mochizuki, Tokyo (JP);
Munechika Maekawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 951 days.

(21) Appl. No.: 13/219,062

(22) Filed: Aug. 26, 2011

(65) Prior Publication Data
US 2012/0057794 A1 Mar. 8, 2012

(30) Foreign Application Priority Data

Sep. 6, 2010 (JP) .................................. 2010-198987

(51) Int. Cl.
| | | |
|---|---|---|
| *G06K 9/46* | (2006.01) | |
| *G06T 11/60* | (2006.01) | |
| *G06T 19/00* | (2011.01) | |
| *G06F 3/01* | (2006.01) | |
| *G06F 3/048* | (2013.01) | |
| *G06T 5/00* | (2006.01) | |

(52) U.S. Cl.
CPC .............. *G06T 11/60* (2013.01); *G06F 3/011* (2013.01); *G06T 19/00* (2013.01); *G06T 19/006* (2013.01); *G06F 3/048* (2013.01); *G06K 9/4609* (2013.01); *G06T 5/001* (2013.01)

(58) Field of Classification Search
CPC ..... G06T 19/006; G06T 19/00; G06T 7/0081; G06T 5/001; G06F 3/011
See application file for complete search history.

(56) References Cited

U.S. PATENT DOCUMENTS

| | | | |
|---|---|---|---|
| 6,339,430 B1 * | 1/2002 | Takeshita | ....................... 345/592 |
| 6,798,408 B2 * | 9/2004 | Tokuyama et al. | ........... 345/426 |
| 7,171,627 B2 | 1/2007 | Sawatari | |
| 7,386,799 B1 | 6/2008 | Clanton et al. | |

(Continued)

FOREIGN PATENT DOCUMENTS

| | | |
|---|---|---|
| JP | 2007-027990 | 2/2007 |
| JP | 2010-158056 | 7/2010 |

OTHER PUBLICATIONS

Shibata, F. "A View Management for Mobile Mixed Reality Systems." 14th Eurographics Symposium on Virtual Environments; EGVE 2008. Eindhoven, The Netherlands; May 29-30, 2008. The Eurographics Association No. XP-002655108, pp. 1-8.

(Continued)

*Primary Examiner* — Saptarshi Mazumder
(74) *Attorney, Agent, or Firm* — Chip Law Group

(57) ABSTRACT

There is provided an image processing device including a recognition unit configured to recognize a plurality of users being present in an input image captured by an imaging device, an information acquisition unit configured to acquire display information to be displayed in association with each user recognized by the recognition unit, and an output image generation unit configured to generate an output image by overlaying the display information acquired by the information acquisition unit on the input image. The output image generation unit may determine which of first display information associated with a first user and second display information associated with a second user is to be overlaid on a front side on the basis of a parameter corresponding to a distance of each user from the imaging device.

20 Claims, 24 Drawing Sheets

(56) References Cited

U.S. PATENT DOCUMENTS

| | | | |
|---|---|---|---|
| 2004/0054819 A1* | 3/2004 | Daimoto et al. | 710/1 |
| 2006/0126905 A1* | 6/2006 | Loo | 382/118 |
| 2007/0165968 A1* | 7/2007 | Terayoko | 382/305 |
| 2008/0101575 A1* | 5/2008 | Amador et al. | 379/202.01 |
| 2008/0118156 A1* | 5/2008 | Okada | 382/195 |
| 2008/0152197 A1* | 6/2008 | Kawada | 382/115 |
| 2008/0284900 A1* | 11/2008 | Abe | 348/349 |
| 2009/0005118 A1* | 1/2009 | Kim et al. | 455/558 |
| 2009/0073117 A1 | 3/2009 | Tsurumi et al. | |
| 2009/0144661 A1* | 6/2009 | Nakajima et al. | 715/835 |
| 2010/0053364 A1* | 3/2010 | Mino et al. | 348/222.1 |
| 2010/0073506 A1* | 3/2010 | Uehara et al. | 348/222.1 |
| 2010/0109998 A1* | 5/2010 | Hwang et al. | 345/156 |
| 2011/0052086 A1* | 3/2011 | Tobita et al. | 382/224 |

OTHER PUBLICATIONS

Bohus, D. "Dialog in the Open World". Proceedings of the 2009 International Conference on Multimodal Interfaces, ICMI-MLMI '09 —Jan. 1, 2009; New York, New York, pp. 31-38.

Park, S. "A New 3-Dimensional Comic Chat Environment for On-line Game Avatars." $2^{nd}$ IEEE International Conference on Digital Gam and Intelligent Toy Enhanced Learning; Piscataway, NJ; Nov. 17, 2008, pp. 18-22.

Polys, N. "Design and Display of Enhancing Information in Desktop Information-rich Virtual Environments: Challenges and Techniques." Virtual Reality, vol. 8, No. 1, XP055013647; Mar. 1, 2004; pp. 41-54.

Goldmann, L. "Multimodal Analysis for Universal Smart Room Applications." $7^{th}$ International Workshop on Image Analysis for Multimedia Interactive Services (WIAMIS 2006, XP055013793; Incheon, Korea, pp. 1-4.

Azuma, R. "Evaluating Label Placement for Augmented Reality View Management." Mixed and Augmented Reality, 2003. Proceedings of the Second IEEE and ACM International Symposiumon Mixed and Augmented Reality (ISMAR '03) Oct. 7-10, 2003, pp. 1-10.

European Search Report issued Dec. 20, 2011 in Munich for corresponding European patent application No. EP 11 17 9328.

\* cited by examiner

FIG.5

| OBJECT ID 181 | USER ID 182 | SHAPE 183 | COLOR 184 | SIZE 185 | DISPLAY POSITION 186 | TRANSPARENCY 187 | LAYER 188 | |
|---|---|---|---|---|---|---|---|---|
| | | DISPLAY INFORMATION 189 | | | | | | |
| D01A | Ua | Obj1 | RED | 150% | (X1, Y1) | 20% | 1 | } 190a |
| | | NICKNAME: Risa, HOBBY: READING | | | | | | |
| D02A | Ua | Obj2 | RED | 150% | (X2, Y2) | 20% | 1 | } 190b |
| | | HELLO. | | | | | | |
| D01B | Ub | Obj1 | BLACK | 120% | (X3, Y3) | 30% | 2 | } 190c |
| | | NICKNAME: Taro, HOBBY: PLAYING GUITAR | | | | | | |
| D01C | Uc | Obj1 | BLACK | 50% | (X4, Y4) | 80% | 3 | } 190d |
| | | NICKNAME: Jiro, HOBBY: DRIVING | | | | | | |

180

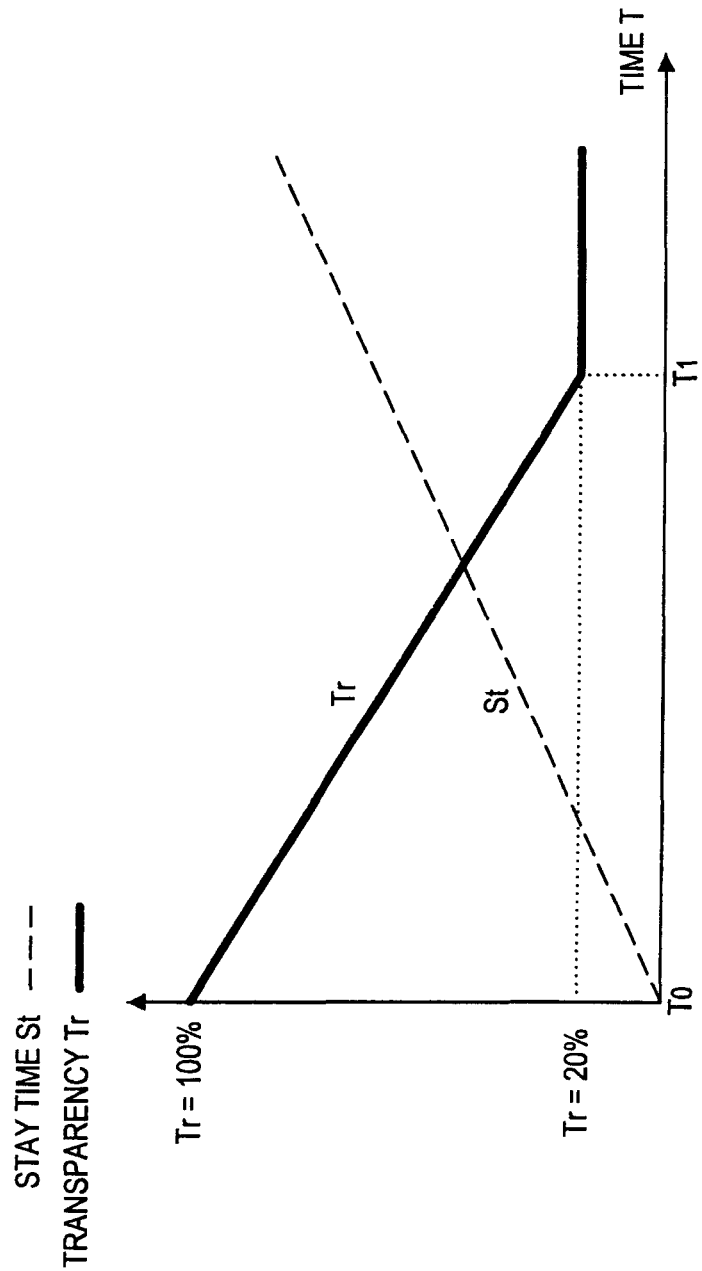

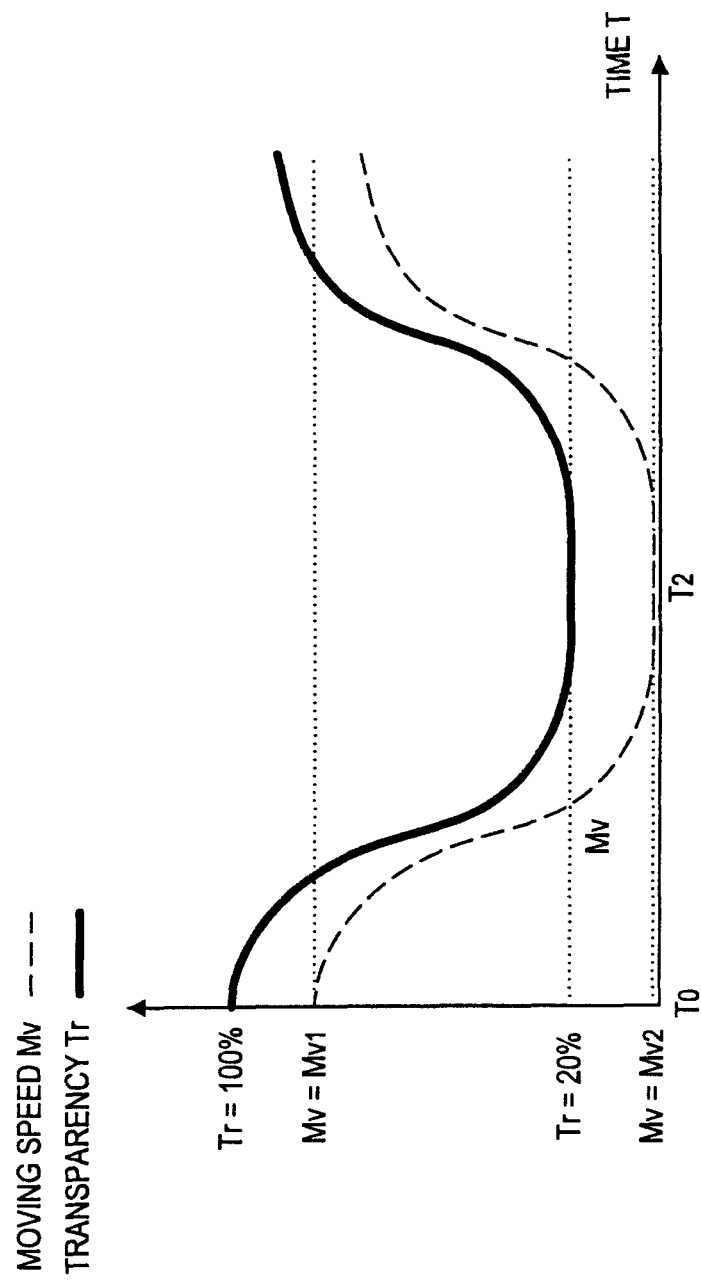

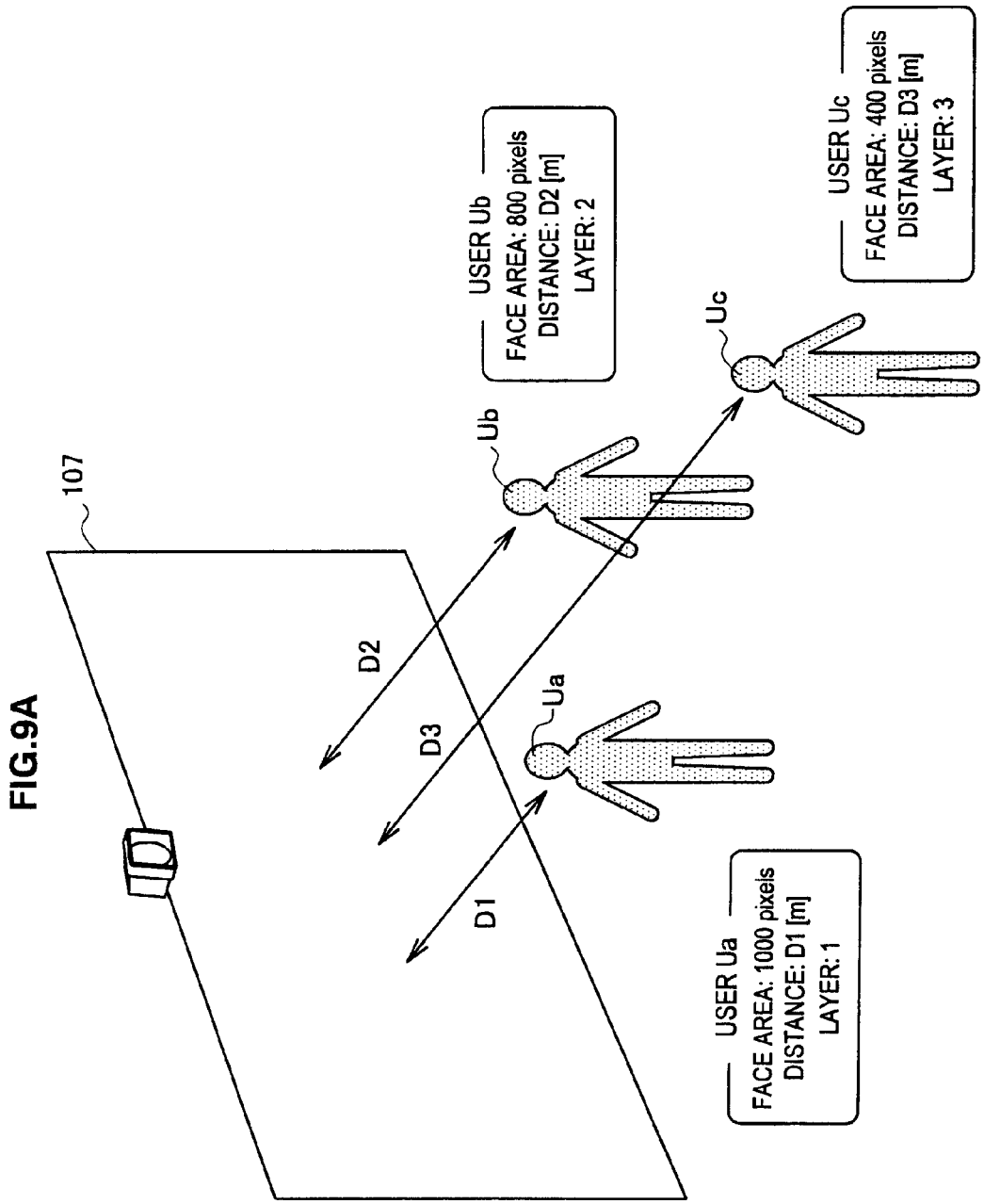

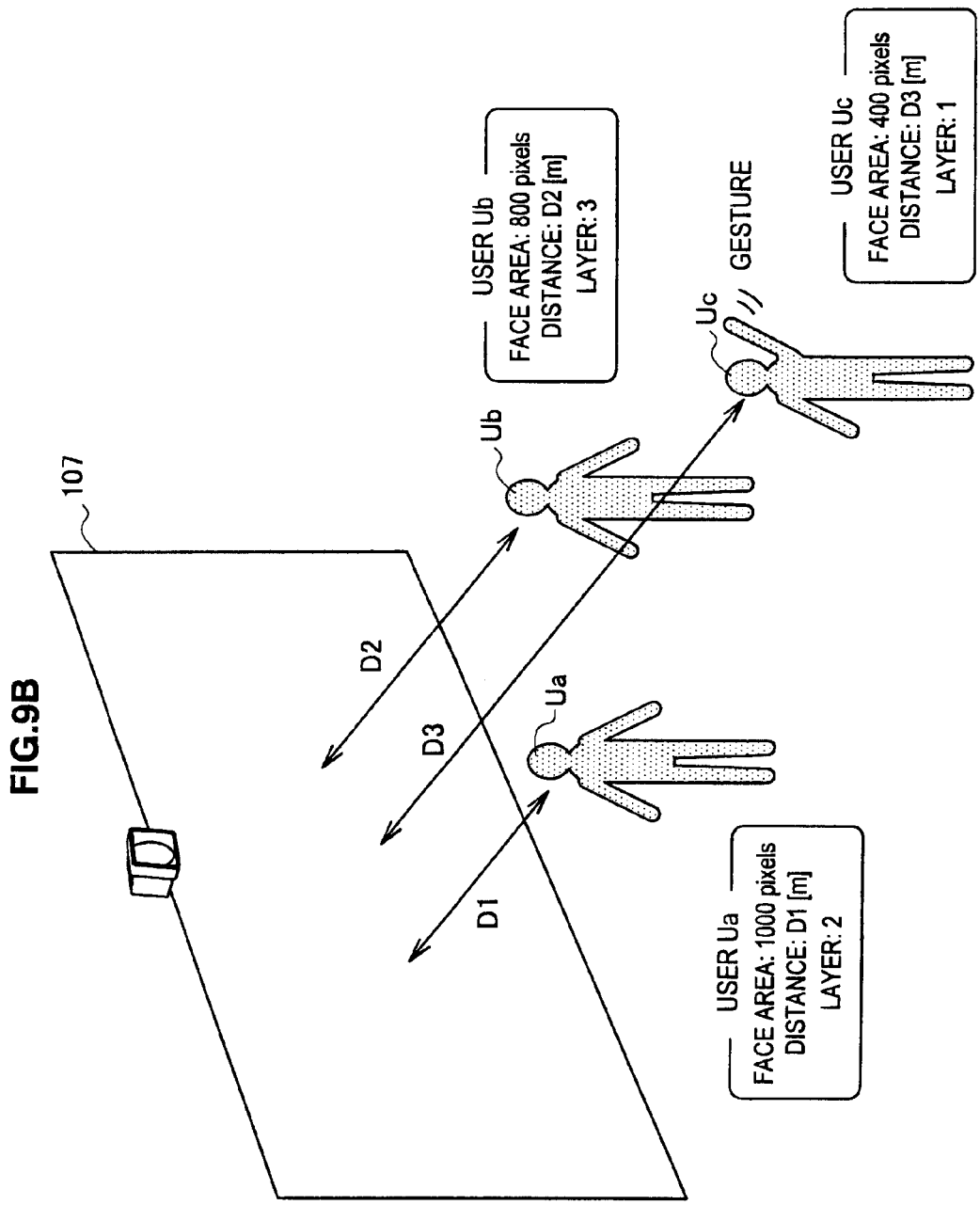

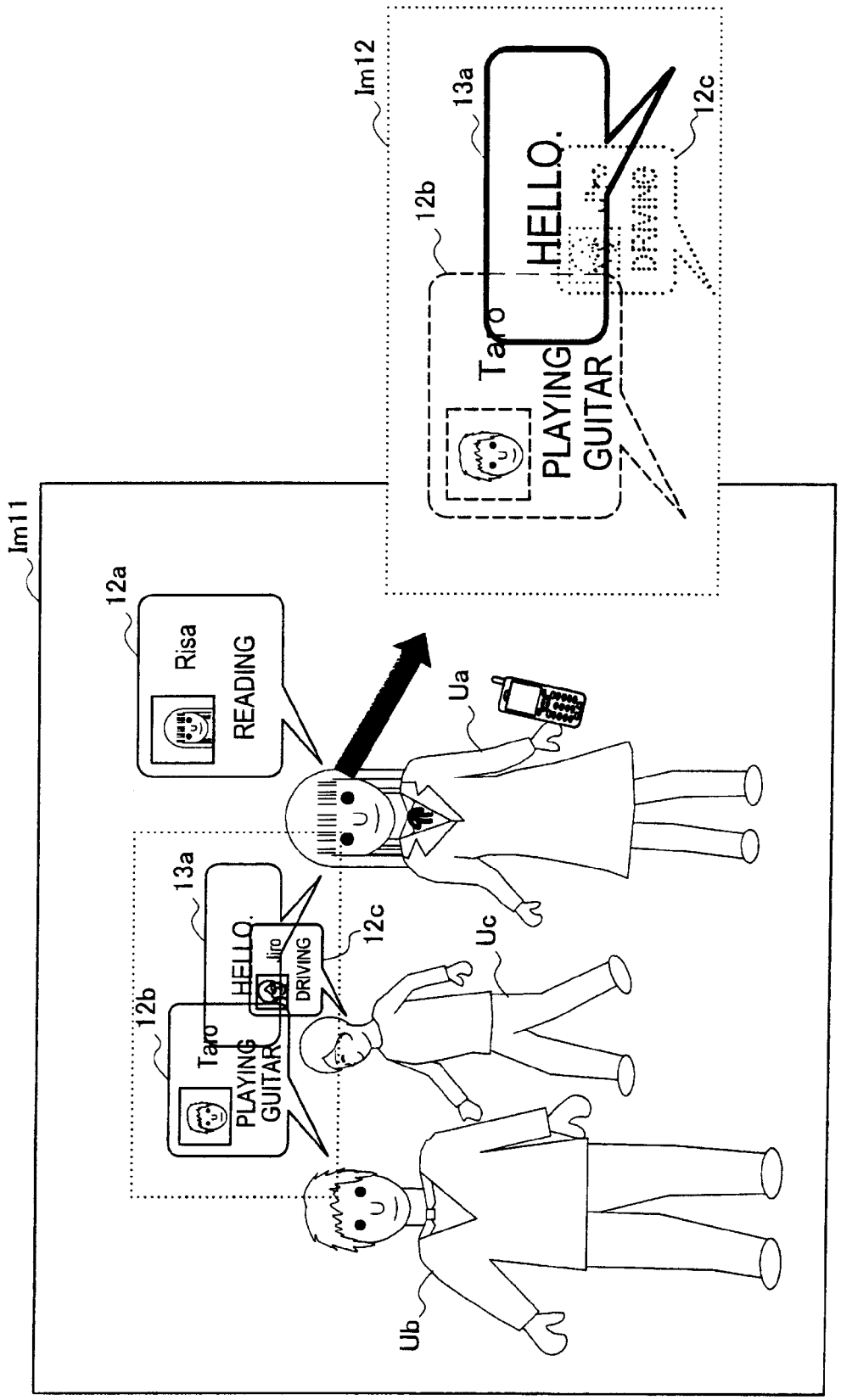

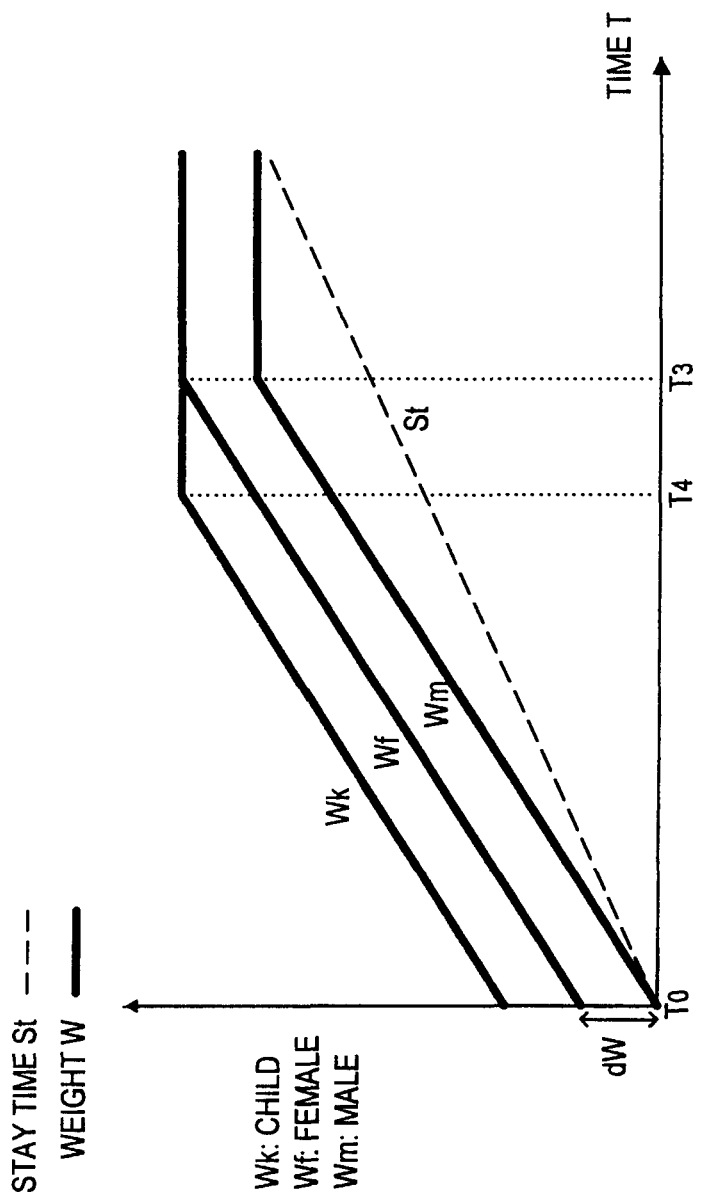

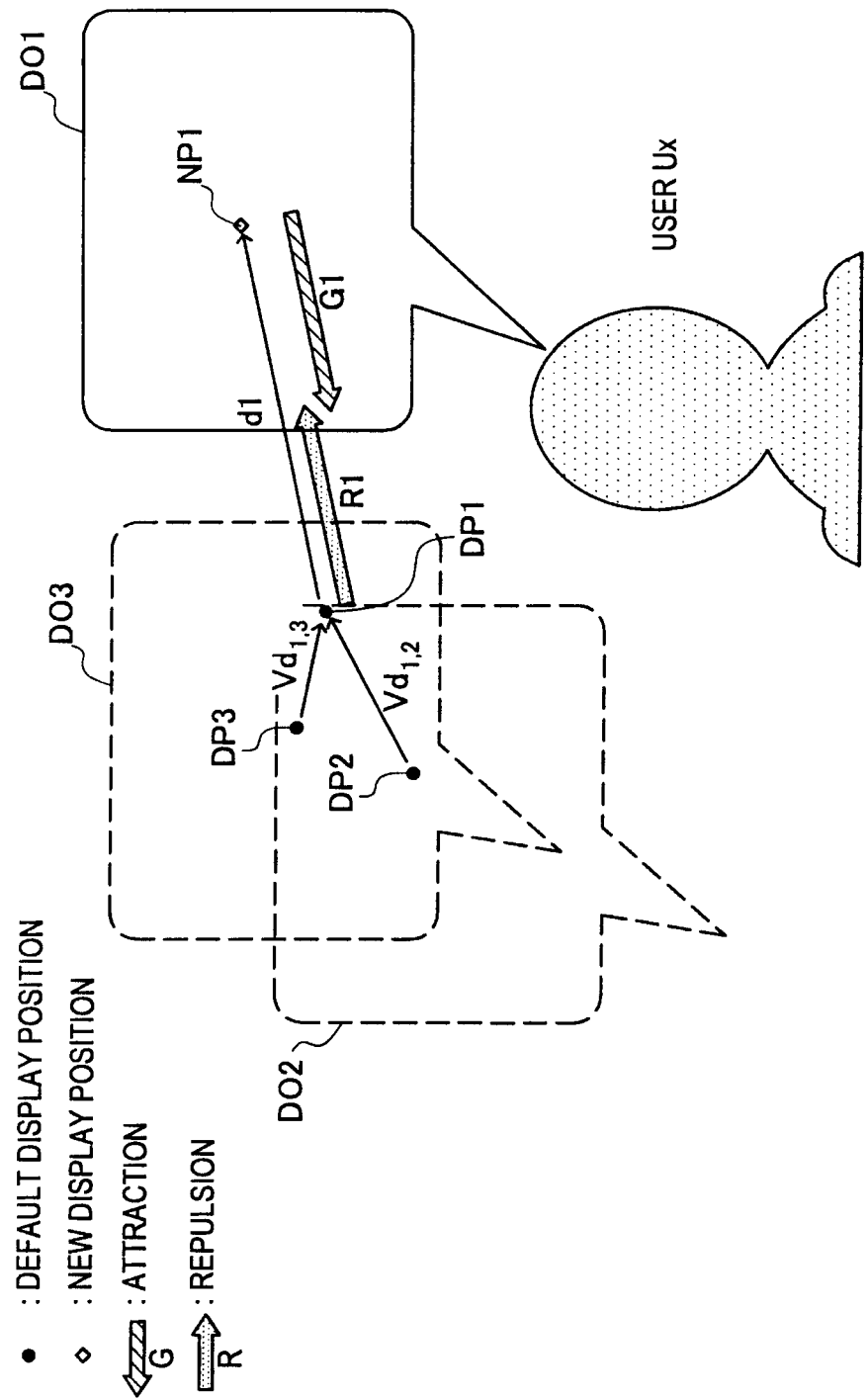

IMAGE PROCESSING DEVICE, AND IMAGE PROCESING METHOD

BACKGROUND

The present disclosure relates to an image processing device, a program, and an image processing method.

In recent years, a technology called augmented reality (AR) has been drawing attention that overlays information on an image obtained by capturing a real space and presents the resultant image to a user. Information that is overlaid on an image with the AR technology comes in a variety of types. For example, JP 2010-158056A discloses a technology of adding hyperlink information to an object that is moving in a real space being present in an input image, and presenting the resultant image.

SUMMARY

However, when an input image contains a number of objects to which information should be added, there is a possibility that information to be displayed may be crowded, and thus the understandability of an output image presented to a user may be lost. For example, in communication between users via an image of augmented reality, if information about users who are actively involved in the communication and information about another user who is located in the surrounding area are displayed without distinction, a smooth communication may be hindered due to the crowded information, and thus a circumstance may arise where it is not easily known which information is sent by which user.

In light of the foregoing, it is desirable to provide an image processing device, a program, and an image processing method, which are novel and improved, and which can present information in a more understandable way in a circumstance where pieces of information are crowded in an image of augmented reality.

According to an embodiment of the present disclosure, there is provided an image processing device including a recognition unit configured to recognize a plurality of users being present in an input image captured by an imaging device, an information acquisition unit configured to acquire display information to be displayed in association with each user recognized by the recognition unit, and an output image generation unit configured to generate an output image by overlaying the display information acquired by the information acquisition unit on the input image. The output image generation unit may determine which of first display information associated with a first user and second display information associated with a second user is to be overlaid on a front side on the basis of a parameter corresponding to a distance of each user from the imaging device.

When the first display information and the second display information overlap each other in the output image, the output image generation unit may place the first display information on a front side of the second display information if the distance of the first user from the imaging device is shorter than the distance of the second user from the imaging device.

The recognition unit may further recognize a size of a face area of each user being present in the input image, and the output image generation unit may use as the parameter the size of the face area of each user recognized by the recognition unit.

The output image generation unit may measure a length of time for which each user recognized by the recognition unit is present in the input image or a moving speed of each user, and the output image generation unit may set a transparency of the display information overlaid on the input image in accordance with the length of time or the moving speed measured for the user associated with the display information.

The output image generation unit may set the transparency of the display information of a user who is present in the input image for a longer time to a lower level.

The output image generation unit may set the transparency of the display information of a user whose moving speed is lower to a lower level.

The recognition unit may further recognize a gesture of each user, and the output image generation unit may temporarily reduce the transparency of the display information of a user who has made a predetermined gesture.

The recognition unit may further recognize a gesture, a facial expression, or a speaking state of each user, and the output image generation unit may temporarily display display information associated with a user who is making a predetermined gesture or having a predetermined facial expression or with a user who is speaking on the front side regardless of the distance of the user from the imaging device.

The output image generation unit may determine a display size of the display information associated with each user in accordance with the distance of each user from the imaging device.

The information acquisition unit may acquire text input via a text input device as first type display information and acquire a voice input via a voice input device as second type display information, and the output image generation unit may set a shape of an object for displaying the first type display information to a shape representing a thought, and sets a shape of an object for displaying the second type display information to a shape representing a speech.

The information acquisition unit may acquire information input via a text input device or a voice input device as the display information, the output image generation unit may analyze the display information acquired by the information acquisition unit to determine whether the display information is third type display information corresponding to a thought of the user or fourth type display information corresponding to a speech of the user, and the output image generation unit may set a shape of an object for displaying the third type display information to a shape representing a thought and sets a shape of an object for displaying the fourth type display information to a shape representing a speech.

The information acquisition unit may acquire information input by a user as fifth type display information, and acquire information acquired from an external information source on the basis of information input by a user or attribute information of the user as sixth type display information, and the output image generation unit may display the fifth type display information and the sixth type display information using objects with different shapes.

According to another embodiment of the present disclosure, there is provided a program for causing a computer that controls an image processing device to function as a recognition unit configured to recognize a plurality of users being present in an input image captured by an imaging device, an information acquisition unit configured to acquire display information to be displayed in association with each user recognized by the recognition unit, and an output image generation unit configured to generate an output image by overlaying the display information acquired by the information acquisition unit on the input image. The output image generation unit may determine which of first display information associated with a first user and second display information associated with a second user is to be overlaid on a front side on the basis of a parameter corresponding to a distance of each user from the imaging device.

When the first display information and the second display information overlap each other in the output image, the output image generation unit may place the first display information on a front side of the second display information if the distance of the first user from the imaging device is shorter than the distance of the second user from the imaging device.

The recognition unit may further recognize a size of a face area of each user being present in the input image, and the output image generation unit may use as the parameter the size of the face area of each user recognized by the recognition unit.

The output image generation unit may measure a length of time for which each user recognized by the recognition unit is present in the input image or a moving speed of each user, and the output image generation unit may set a transparency of the display information overlaid on the input image in accordance with the length of time or the moving speed measured for the user associated with the display information.

The output image generation unit may set the transparency of the display information of a user who is present in the input image for a longer time to a lower level.

The output image generation unit may set the transparency of the display information of a user whose moving speed is lower to a lower level.

According to still another embodiment of the present disclosure, there is provided an image processing method including recognizing a plurality of users being present in an input image captured by an imaging device, acquiring display information to be displayed in association with each recognized user, and determining which of first display information associated with a first user and second display information associated with a second user is to be overlaid on a front side on the basis of a parameter corresponding to a distance of each user from the imaging device, and generating an output image by overlaying the acquired display information on the input image.

As described above, the image processing device, the program, and the image processing method in accordance with the embodiments of the present disclosure allow, in a circumstance where pieces of information are crowded in an image of augmented reality, the information to be presented in a more understandable way.

BRIEF DESCRIPTION OF THE DRAWINGS

FIG. 5 is an explanatory diagram showing an exemplary structure of display object data;

FIG. 8A is an explanatory diagram illustrating an example of a transparency setting process;

FIG. 8B is an explanatory diagram illustrating another example of a transparency setting process;

FIG. 9A is a first explanatory diagram illustrating an example of a layer setting process;

FIG. 9B is a second explanatory diagram illustrating an example of a layer setting process;

FIG. 10 is an explanatory diagram showing an example of an output image in accordance with the first embodiment;

FIG. 13 is an explanatory diagram illustrating an example of a weight determination process;

FIG. 14B is a second explanatory diagram illustrating the first example of the display position determination process;

DETAILED DESCRIPTION OF THE EMBODIMENTS

Figure 1:
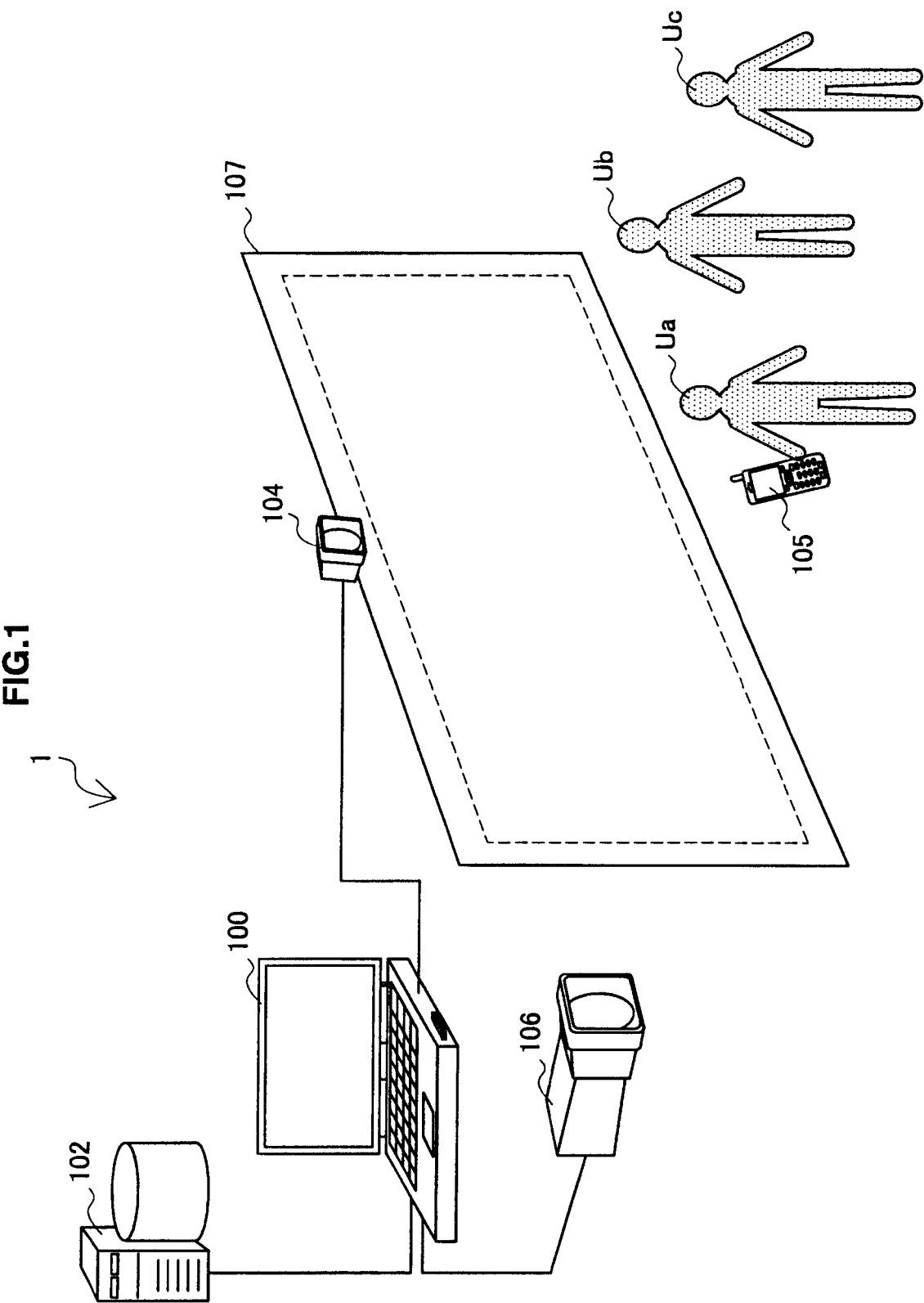
FIG. 1 is a schematic diagram showing an overview of an image processing system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The "DETAILED DESCRIPTION OF THE EMBODIMENTS" will be described in accordance with the following order.

1. Overview of System
2. Description of the First Embodiment
   2-1. Exemplary Configuration of Image Processing Device
   2-2. Attributes of Display Object
   2-3. Example of Output Image
   2-4. Process Flow
   2-5. Conclusion of the First Embodiment 3. Description of the Second Embodiment
3-1. Exemplary Configuration of Image Processing Device
3-2. Example of Output Image
3-3. Process Flow
3-4. Conclusion of the Second Embodiment 1. Overview of System First, an overview of an image processing system in accordance with one embodiment of the present disclosure will be described with reference to FIG. 1. FIG. 1 is a schematic diagram showing an overview of an image processing system 1 in accordance with one embodiment of the present disclosure. Referring to FIG. 1, the image processing system 1 includes an image processing device 100, a database 102, an imaging device 104, and a display device 106.

The image processing device 100 is connected to the database 102, the imaging device 104, and the display device 106. The image processing device 100 can be, for example, a general-purpose computer such as a PC (Personal Computer) or a workstation, or a dedicated computer for a specific purpose. As described in detail below, the image processing device 100 acquires an image captured by the imaging device 104 as an input image and outputs an output image, which has been processed, to the display device 106.

The database 102 is a device for storing information to be used for the image processing device 100 to perform processes. The database 102 is not limited to the example of FIG. 1, and can be built in the image processing device 100. Examples of information stored in the database 102 include an identifier that uniquely identifies each user of the image processing system 1 (hereinafter referred to as a user ID), feature quantity information for recognizing each user, attribute information of each user, and image data. The information stored in the database 102 can be output from the database 102 in response to a request when the image processing device 100 performs a process. Alternatively, the image processing device 100 can periodically download the information stored in the database 102.

The imaging device 104 is a device that captures an image of a real space in which a user can exist. The imaging device 104 is arranged on the upper side of a screen 107 such that the imaging device 104 is opposite a space ahead of the screen 107. The imaging device 104 captures images of a real space ahead of the screen 107, and outputs a series of the images (i.e., video) to the image processing device 100 in a time-series manner.

The display device 106 is a device that displays a series of output images generated by the image processing device 100. In the examples of FIG. 1, the display device 106 is a projector. The display device 106 projects the output image input from the image processing device 100 onto the screen 107. In this case, the display device 106 is a rear projector. Note that the display device 106 is not limited to the example of FIG. 1, and can be a PDP (Plasma Display Panel), an LCD (Liquid Crystal Display), or the like.

The screen 107 is a display screen of the display device 106. In the image processing system 1, the display screen of the display device 106 is arranged such that it is opposite a real space in which a user exists. In the example of FIG. 1, three users, Ua, Ub, and Uc are located in front of the screen 107.

The user of the image processing system 1 can interact with the image processing system 1 using a terminal device. In the example of FIG. 1, the user Ua is holding a terminal device 105. The terminal device 105 can be, for example, a PC, a smartphone, or a PDA (Personal Digital Assistant). The terminal device 105 communicates with the image processing device 100 in accordance with any wireless communication protocol such as, for example, a wireless LAN (Local Area Network), Zigbee®, or Bluetooth®. The terminal device 105 can be used for the user Ua to, for example, input text or voice or register information of the user.

Figure 2:
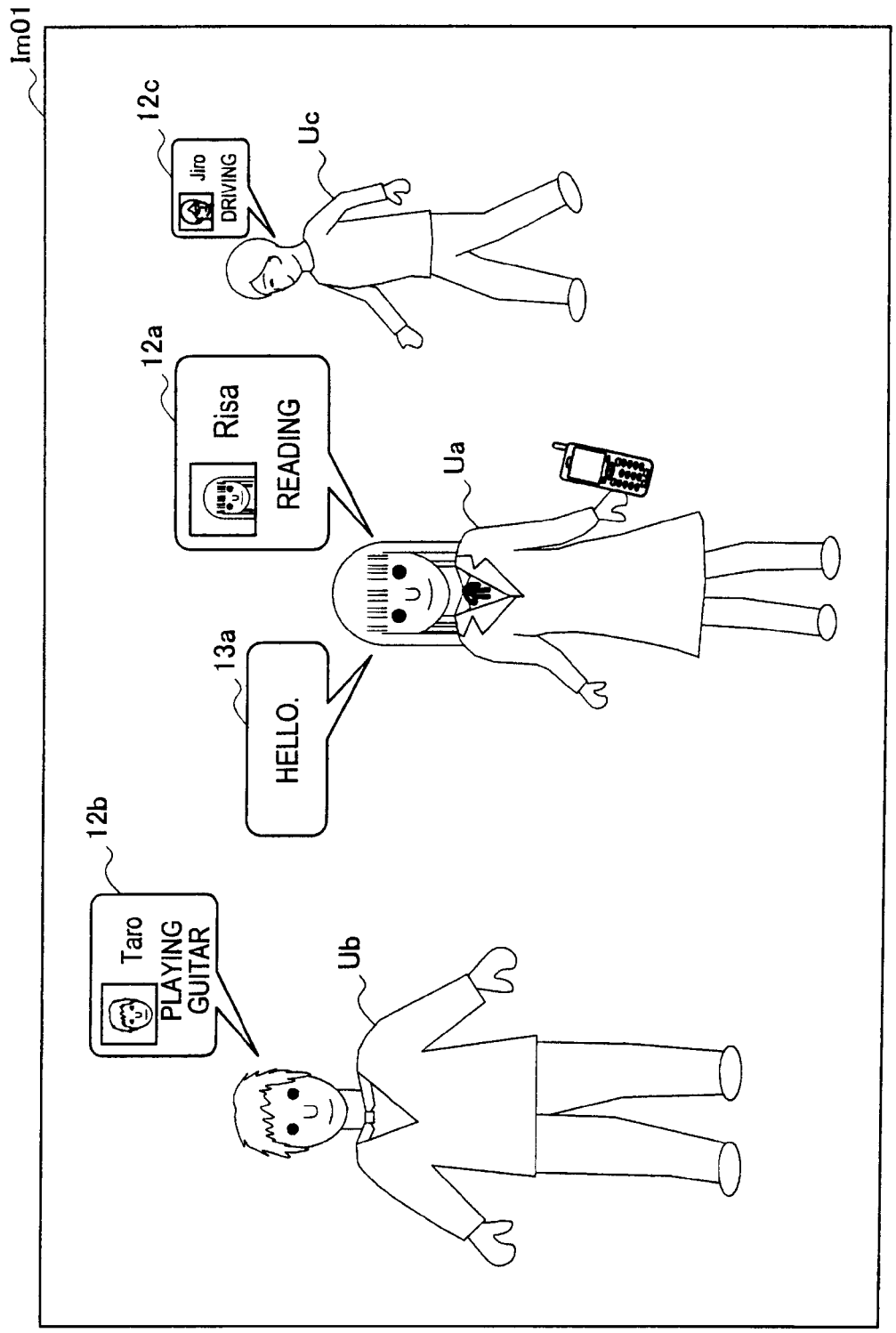
FIG. 2 is an explanatory diagram showing an example of an output image displayed with the image processing system of FIG. 1.

FIG. 2 is an explanatory diagram illustrating an example of an output image displayed with the image processing system 1 exemplarily shown in FIG. 1. Referring to FIG. 2, an output image Im01 as an example is shown. The three users Ua, Ub, and Uc are present in the output image Im01. Display objects 12a, 12b, and 12c are overlaid on areas around the three users Ua, Ub, and Uc, respectively. Each display object is an object for displaying information associated with the corresponding user. In this specification, information that is displayed in association with a user by the image processing device 100 shall be referred to as "display information." In the example of FIG. 2, each of the display objects 12a, 12b, and 12c includes a face image, a nickname, and attribute information (e.g., hobby) of the corresponding user as the display information. Further, a display object 13a is overlaid on an area around the user Ua. The display object 13a contains a message input by the user Ua as the display information. Such display objects are overlaid on the image by the image processing device 100 as described in detail below.

Such an image processing system 1 can be used to deepen exchanges between users in a place in which a large number of people communicate with one another such as, for example, parties, conference rooms, or exhibitions. Alternatively, the image processing system 1 can be used in a business scene like a video conference, for example. In such a case, an imaging device and a display device are arranged in each place so that a video captured at a given place can be displayed at another place together with display information.

Herein, when a plurality of users are present in an input image in the image processing system 1, a circumstance may arise in which a number of display objects should be displayed in an output image. In such a case, the understandability of the information for a user who views the output image can differ depending on in which position and in what way each display object is arranged. If the information is difficult to be understood, smooth communication can be interrupted. Thus, the following sections will describe two embodiments for presenting information in a more understandable way to support smooth communication.

<2. Description of the First Embodiment>

[2-1. Exemplary Configuration of Image Processing Device>

Figure 3:
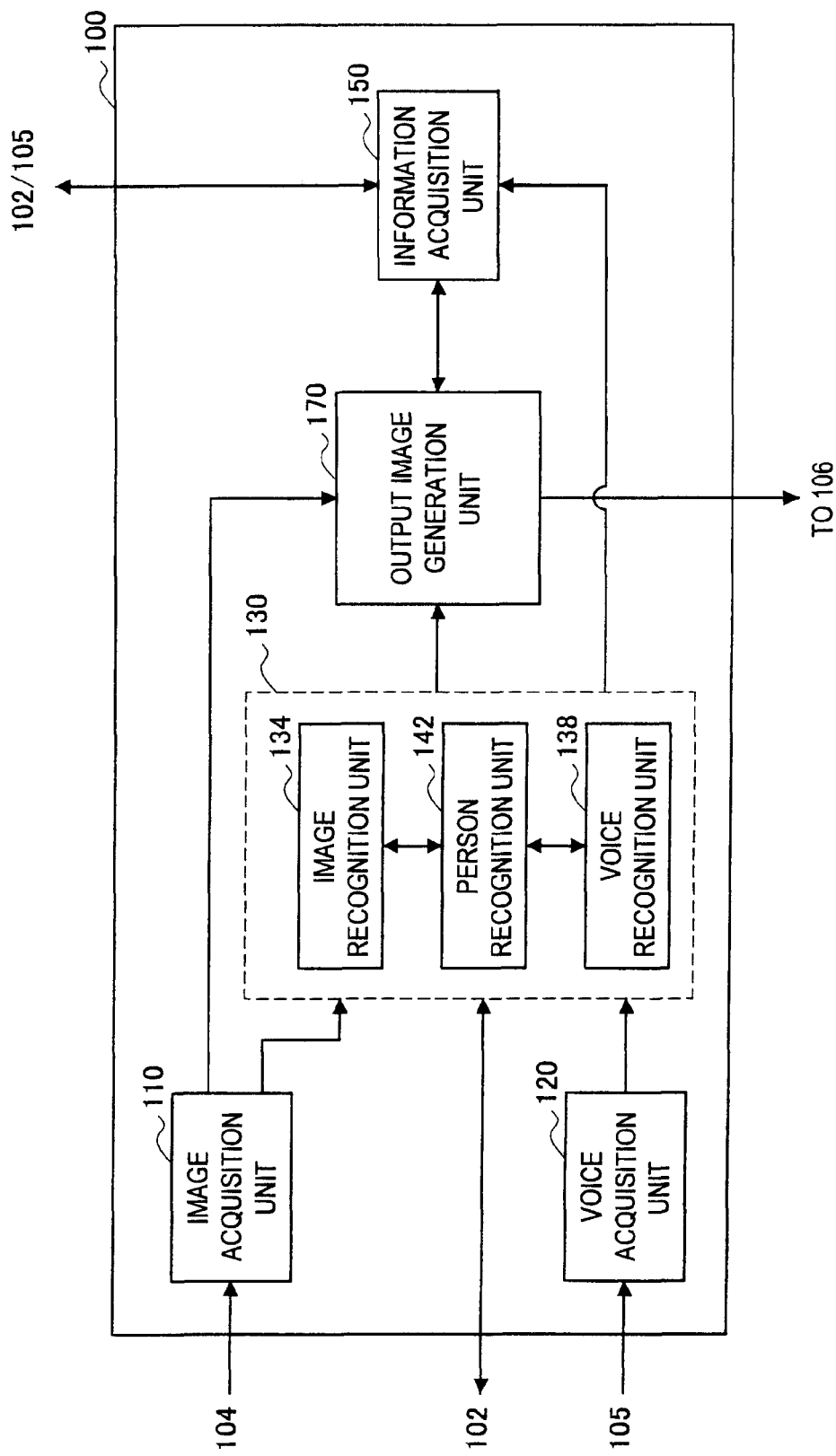
FIG. 3 is a block diagram showing an exemplary configuration of an image processing device in accordance with a first embodiment.

FIG. 3 is a block diagram showing an exemplary configuration of the image processing device 100 in accordance with the first embodiment of the present disclosure. Referring to FIG. 3, the image processing device 100 includes an image acquisition unit 110, a voice acquisition unit 120, a recognition unit 130, an information acquisition unit 150, and an output image generation unit 170. In addition, the recognition unit 130 includes an image recognition unit 134, a voice recognition unit 138, and a person recognition unit 142.

(Image Acquisition Unit)

The image acquisition unit 110 acquires a series of input images captured by the imaging device 104. Then, the image acquisition unit 110 outputs the acquired input images to the image recognition unit 134 of the recognition unit 130 and the output image generation unit 170.

(Voice Acquisition Unit)

The voice acquisition unit 120 acquires a voice uttered by the user as an input voice. The acquisition of a voice with the voice acquisition unit 120 can be performed by, for example, receiving a voice signal transmitted from the terminal device 105 that the user is holding. Alternatively, a microphone can be disposed around the screen 107. In the latter case, the voice acquisition unit 120 acquires an input voice via the microphone disposed. Then, the voice acquisition unit 120 outputs the acquired input voice to the voice recognition unit 138 of the recognition unit 130.

(Image Recognition Unit)

The image recognition unit 134 applies a known face recognition method (for example, see JP 2008-131405A) to the input image input from the image acquisition unit 110, and detects a face area of a user being present in the input image. In addition, the image recognition unit 134 calculates, for the detected face area, a feature quantity (hereinafter referred to as an image feature quantity) used for individual identification. Then, the image recognition unit 134 outputs the calculated image feature quantity to the person recognition unit 142.

Then, the image recognition unit 134, when the person recognition unit 142 has identified a user corresponding to each face area (has identified a user ID corresponding to each face area), associates the user with the identified user ID, and outputs information representing the position and the size of each face area to the output image generation unit 170.

Further, the image recognition unit 134 can recognize, on the basis of the image feature quantity of each user, attributes such as a facial expression (e.g., a smile) of the user, the speaking state of the user (whether or not the user is speaking), or the sex or age group of the user, for example. In such a case, the image recognition unit 134 outputs information representing the recognized facial expression, speaking state, sex, age group, or the like to the output image generation unit 170.

Furthermore, the image recognition unit 134 can also detect a hand area of a user being present in the input image and recognize a gesture of the user on the basis of a movement path of the position of the detected hand area. In such a case, the image recognition unit 134 outputs information representing the type of the recognized gesture to the output image generation unit 170.

(Voice Recognition Unit)

The voice recognition unit 138 applies a known voice recognition method to an input voice input from the voice acquisition unit 120, and extracts a speech uttered by the user as text data (hereinafter referred to as "speech data"). Then, the voice recognition unit 138 associates the extracted speech data with the user ID and outputs them to the information acquisition unit 150.

The voice recognition unit 138 can, when an input voice is acquired via the terminal device 105, identify the corresponding user on the basis of the device ID, the account ID, or the like of the terminal device 105 that is the source of transmission. Meanwhile, when an input voice is acquired via a voice input device disposed around the screen 107, for example, the voice recognition unit 138 can identify the individual user by checking a voice feature quantity extracted from the input voice against the voice feature quantity of the user registered in the database 102 in advance. Further, the voice recognition unit 138 can, for example, estimate the direction of the voice source of the input voice and identify the individual user on the basis of the estimated direction of the voice source.

(Person Recognition Unit)

The person recognition unit 142 identifies each of one or more users being present in the input image captured by the imaging device 104. More specifically, the person recognition unit 142 checks the image feature quantity input from the image recognition unit 134 against the image feature quantity of a face of a known user registered in the database 102 in advance, for example (for the check method, see JP 2009-53916A, for example). Then, the person recognition unit 142 associates each face area recognized by the image recognition unit 134 with the identified user ID of the user as a result of the checking. Alternatively, the personal identification section 142 can, for example, check the voice feature quantity input from the voice recognition unit 138 against the voice feature quantity of a voice of a known user registered in the database 102 in advance.

(Information Acquisition Unit)

The information acquisition unit 150 acquires display information to be displayed in association with each user recognized by the recognition unit 130. In this embodiment, examples of the display information to be displayed in association with each user can include the attribute information of the user and input information input by the user.

The information acquisition unit 150 acquires the attribute information of a user from, for example, the database 102. The attribute information that the information acquisition unit 150 acquires from the database 102 is registered in the database 102 in advance by the user. The attribute information registered in the database 102 can be any information such as, for example, a nickname, age, sex, hobby, or team/department of the user; or an answer of the user to a particular question. Alternatively, for example, the information acquisition unit 150 can acquire the sex, age group, or the like of each user recognized by the image recognition unit 134 as the attribute information.

The input information that the information acquisition unit 150 acquires as the display information includes, for example, text that is input via a text input device. For example, the user can input text using the terminal device 105 as a text input device, and then transmit the text as the input information to the image processing device 100 from the terminal device 105. In addition, the input information that the information acquisition unit 150 acquires as the display information includes, for example, the aforementioned speech data recognized by the voice recognition unit 138.

Further, the information acquisition unit 150 can search an external information source for given information that matches a keyword contained in the attribute information of the user or the input information input by the user, and then acquire information, which is obtained as a search result (hereinafter referred to as search information), as the display information. The external information source can be, for example a web-related service such as an online dictionary service, an SNS (Social Network Service), or a knowledge-sharing service.

Figure 4:
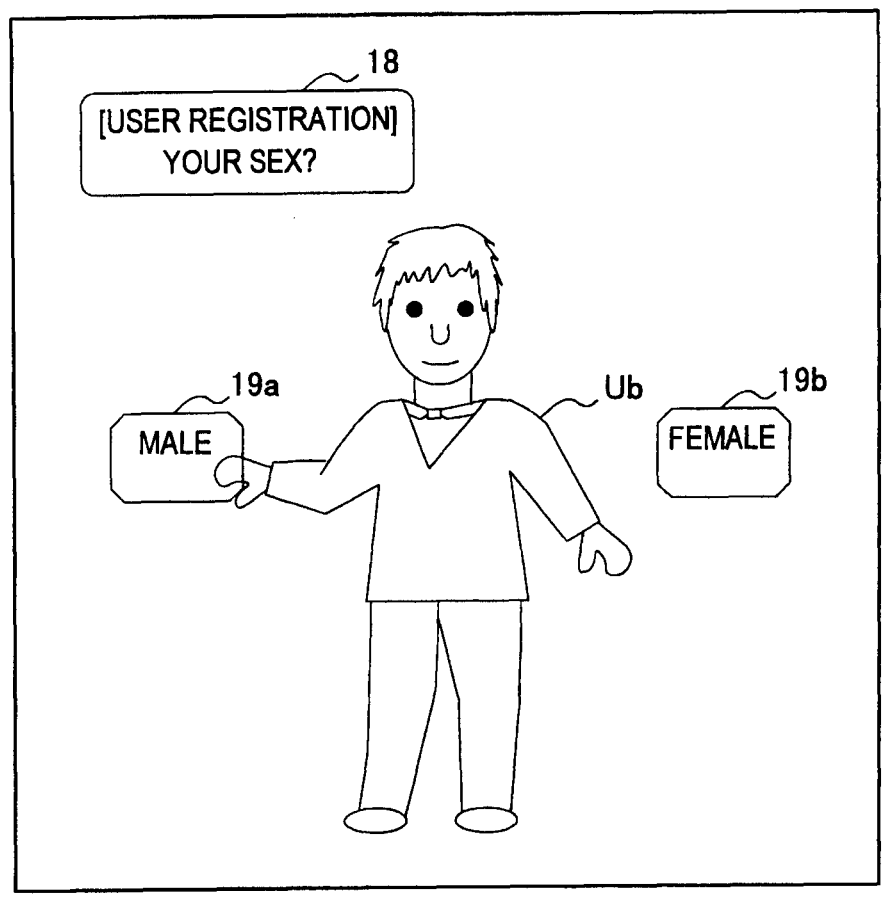
FIG. 4 is an explanatory diagram showing an example of a user interface for registering a new user.

In addition, the information acquisition unit 150 provides, for example, a user interface (UI) for a user to register information about a new user. The UI for the user registration can be displayed on the screen 107. The UI for the user registration can be, for example, a UI that uses an image as exemplarily shown in FIG. 4. According to the example of the UI shown in FIG. 4, the user can register the attribute information of himself/herself in the image processing system 1 by making a gesture of touching a choice field 19a or 19b to answer a question 18 displayed on the screen 107. Alternatively, the user interface for the user registration can be provided via a specific screen of the image processing device 100 or a screen of the terminal device 105.

(Output Image Generation Unit)

The output image generation unit 170 generates an output image by overlaying the display information acquired by the information acquisition unit 150 on the input image input by the image acquisition unit 110. More specifically, the output image generation unit 170 first determines the attributes of a display object for displaying the display information acquired by the information acquisition unit 150. Examples of the attributes of a display object include data about the shape, color, size, display position, transparency, and layer of the display object. Among them, the layer represents the ordinal number of each display object for an order of display objects that are overlaid on top of one another. For example, when a plurality of display objects overlap one another, a display object with a lower layer is placed on a more front side. After determining the attributes of each display object for each display information, the output image generation unit 170 generates an image of each display object in accordance with the determined attributes. The next section will more specifically describe the criteria of determining the attributes of each display object with the output image generation unit 170. Then, the output image generation unit 170 generates an output image by overlaying the generated image of the display object on the input image, and sequentially outputs the generated output image to the display device 106.

[2-2. Attributes of Display Object]

(1) Example of Attributes

FIG. 5 is an explanatory diagram showing an exemplary structure of display object data 180 that includes the attribute values determined by the output image generation unit 170. Referring to FIG. 5, the display object data 180 has nine data items including object ID 181, user ID 182, shape 183, color 184, size 185, display position 186, transparency 187, layer 186, and display information 189.

(2) Object ID and User ID

The object ID 181 is an identifier for uniquely identifying each display object overlaid within a single image. The user ID 182 is a user ID representing a user with which a display object, which is identified from the object ID 181, is associated. For example, it is understood from a first record 190a and a second record 190b of the display object data 180 that two display objects D01A and D02A are associated with the user Ua. In addition, it is understood that a display object D01B is associated with the user Ub from a third record 190c, and that a display object D01C is associated with the user Uc from a fourth record 190d.

(3) Shape

The shape 183 represents the shape of the display object. In the example of FIG. 5, the shape of a display object is identified by specifying any one of the predefined display object types: Obj1, Obj2, . . . .

Figure 6A:
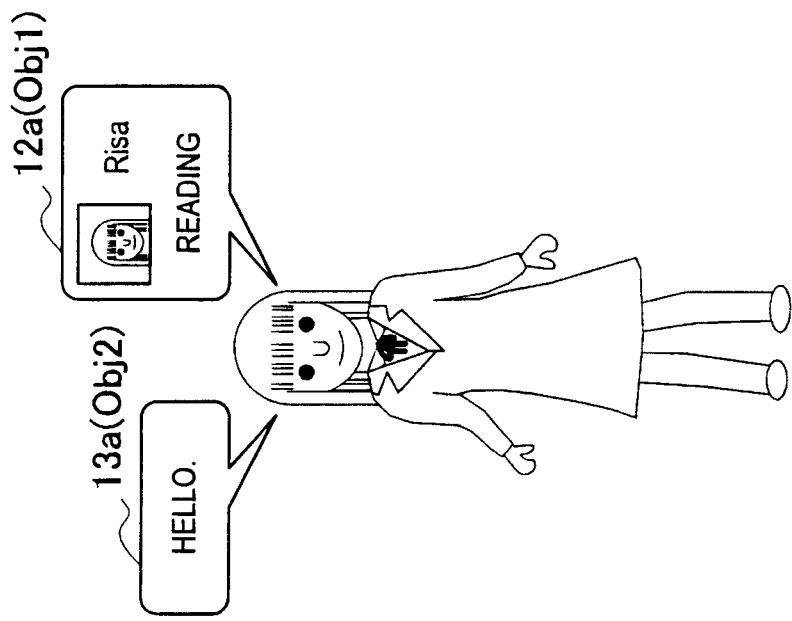
FIG. 6A is an explanatory diagram showing a first example of the shape of a display object.

FIGS. 6A to 6D are explanatory diagrams each showing an example of the type of a display object. Referring to FIG. 6A, display objects 12a and 13a that are exemplarily shown in FIG. 2 are shown. In FIG. 6A, the type of the display object 12a is the type "Obj1," and the type of the display object 13a is the type "Obj2." The display objects of these types Obj1 and Obj2 each have the shape of a so-called speech balloon.

Figure 6B:
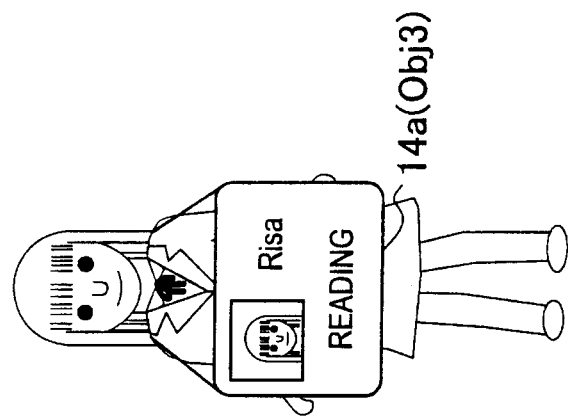
FIG. 6B is an explanatory diagram showing a second example of the shape of a display object.

Next, referring to FIG. 6B, a display object 14a is shown. The type of the display object 14a is "Obj3." The display object 14a has the shape of a signboard worn over the shoulders. The type Obj1 shown in FIG. 6A and the type Obj3 shown in FIG. 6B can be used to display the attribute information of the user, for example. Meanwhile, the type Obj2 shown in FIG. 6A can be used to display information input by the user, for example.

Figure 6C:
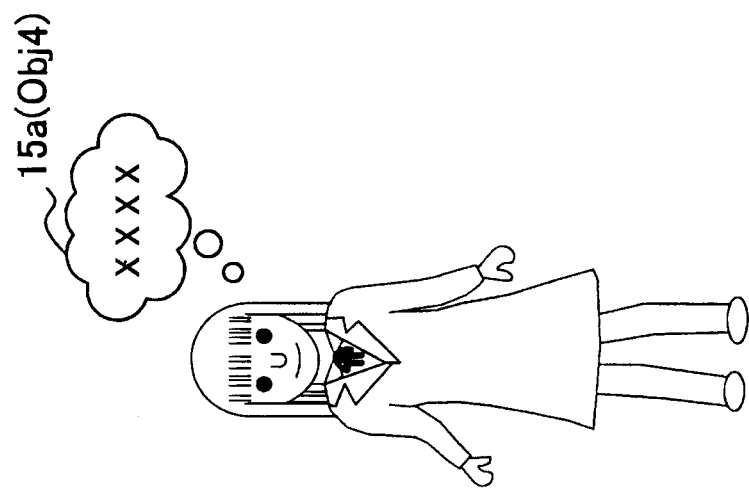
FIG. 6C is an explanatory diagram showing a third example of the shape of a display object.

Further, referring to FIG. 6C, a display object 15a is shown. The type of the display object 15a is "Obj4." The type Obj4 can also be used to display information input by the user, for example.

Herein, the shape of the type Obj2 shown in FIG. 6A is a shape representing a speech of the user. Meanwhile, the shape of the type Obj4 shown in FIG. 6C is a shape representing a thought of the user. The output image generation unit 170 can, when the display information is the input information input via a voice input device, for example, set a display object for displaying the display information to the type Obj2 with a shape representing a speech. In addition, the output image generation unit 170 can, when the display information is the input information input via a text input device, for example, set a display object for displaying the display information to the type Obj4 with a shape representing a thought. Alternatively, for example, the output image generation unit 170 can determine whether the display information is the information corresponding to a thought of the user or the information corresponding to a speech of the user by analyzing the content of the display information, and set a display object corresponding to the thought of the user to the type Obj4 and set a display object corresponding to the speech of the user to the type Obj2.

Figure 6D:
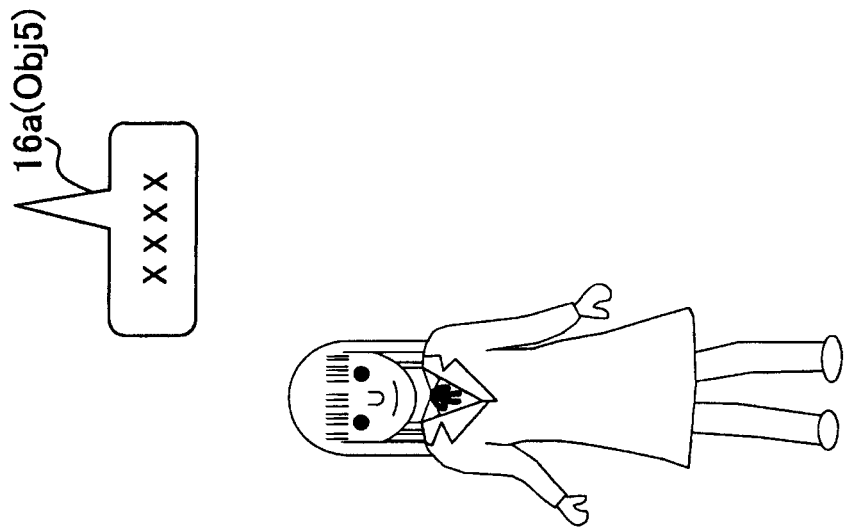
FIG. 6D is an explanatory diagram showing a fourth example of the shape of a display object.

Referring to FIG. 6D, a display object 16a is shown. The type of the display object 16a is "Obj5." The display object 16a also has the shape of a speech balloon. However, the tail of the speech balloon of the type Obj5 does not point to the user but points upward. The output image generation unit 170 can, for example, set a display object for displaying information, which has been acquired from an external information source by the information acquisition unit 150, to the type Obj5. Examples of the information acquired from an external information source include the aforementioned search information.

As described above, when the shape of a display object is changed in accordance with the acquisition path of the display information or an input means used to input the information, it becomes possible for the user to more intuitively and accurately understand the type of the information when communicating with another user with the image processing system 1. In addition, as the user is able to selectively use the shape of an object for displaying the information that the user inputs (a speech or a thought), it is possible to realize richer communication.

(4) Color

The color 184 in FIG. 5 represents the color of the display object (or the color of text of the display information within the display object). The output image generation unit 170 can refer to the attribute information of each user acquired by the information acquisition unit 150 and change the color of each display object in accordance with the attribute value indicating the sex, age group, or the like of the user, for example.

(5) Size

The size 185 represents the size of the display object. In the example of FIG. 5, the size of the display object is represented by the magnification (%) of a default size. The output image generation unit 170, for example, determines the size of a display object for displaying the display information associated with each user in accordance with the distance of each user from the imaging device 104. In this embodiment, the output image generation unit 170 can, instead of measuring the distance of each user from the imaging device 104, use the size of a face area of each user as a parameter corresponding to the distance of each user from the imaging device 104. The size of a face area can be represented by, for example, the number of pixels recognized as belonging to the face area or by the size of a bounding box that surrounds the face area. More specifically, the output image generation unit 170 sets the size of a display object for displaying the display information associated with a user whose face area is larger to a larger size. Note that the upper limit of the size of display objects can be defined in advance. In that case, the output image generation unit 170 sets the size of a display object so that the size of a display object of a user who has approached the imaging device 104 to a distance greater than or equal to a predetermined distance does not exceed the upper limit.

(6) Display Position

The display position 186 indicates the display position of the display object, namely, the two-dimensional coordinates representing the position in which the display object is overlaid within the image. In this embodiment, the output image generation unit 170 arranges each display object such that the center (or a predetermined corner or the like) of the display object is located at a position with a predefined offset from the face area of the user as a reference point.

Figure 7:
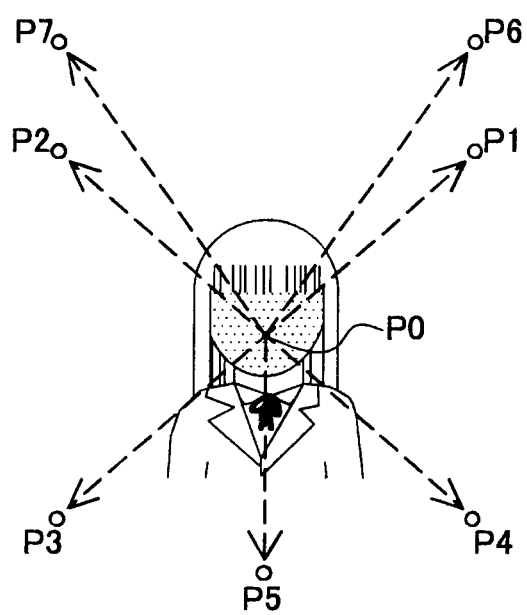
FIG. 7 is an explanatory diagram illustrating the display position of a display object in accordance with the first embodiment.

FIG. 7 is an explanatory diagram illustrating the display position of a display object in accordance with this embodiment. Referring to FIG. 7, a position P0 of the center of gravity of the face area of a user is shown. The position P0 indicates a reference point of an offset for determining the display position of a display object. When the number of display information associated with a given user is one, the output image generation unit 170 sets the display position of a display object for displaying the display information to the position P1. Alternatively, when the number of display information associated with a given user is more than one, the output image generation unit 170 sets the display positions for the second, third, and fourth display information to positions P2, P3, and P4, respectively. The offset between the position PO and each of the positions P1, P2, P3, and P4 is defined in advance. In this specification, such display positions shall be referred to as "default display positions." Note that the default display positions shown in FIG. 7 are only exemplary.

When the type of a display object is the type "Obj3" exemplarily shown in FIG. 6B, the default display position of the display object can be the position P5, for example. Meanwhile, when the type of a display object is the type "Obj5" exemplarily shown in FIG. 6D, the default display position of the display object can be the positions P6 and P7, for example.

(7) Transparency

The transparency 187 in FIG. 5 represents the transparency of the display object. When transparency is set for display objects, it becomes possible to allow a user to, even when a plurality of display objects are overlaid on top of one another, view the display object on the rear side. In this embodiment, the output image generation unit 170 measures the length of time for which each user recognized by the recognition unit 130 is present in the input image (hereinafter, such time shall be referred to as a "stay time") or the moving speed of each user. Then, the output image generation unit 170 sets the transparency of a display object for displaying display information in accordance with the measured stay time or moving speed of the user associated with the display information.

FIG. 8A is an explanatory diagram illustrating an example of a transparency setting process of the output image generation unit 170. In the example of FIG. 8A, the output image generation unit 170 sets the transparency of a display object associated with a user in accordance with the stay time of the user in the image.

The horizontal axis of FIG. 8A represents the time axis (time T), and the vertical axis represents the stay time St indicated by a dashed line and the level of transparency Tr indicated by a solid line. In the example of FIG. 8A, as a user who had appeared in the image at time $T_0$ continuously stays in the image, the stay time St of the user linearly increases along the time axis. Meanwhile, the transparency Tr of the display object at time $T_0$ is 100%. That is, at the moment when the user has just appeared in the image, the display object is not viewed. Then, as the stay time St increases, the transparency Tr of the display object decreases. That is, while the user stays in the image, the tone of the display object gradually becomes darker. Then, when the transparency Tr of the display object reaches 20% at time $T_1$, the output image generation unit 170 stops reducing the transparency Tr. This is to allow a display object, which is overlaid on the rear side, to be viewed at least to a certain degree.

Herein, the length of time for which a user stays in the image is considered to represent the interest level of the user in or the contribution level of the user to the communication provided by the image processing system 1. Thus, if the transparency of a display object of a user whose stay time is longer is set to a lower level, it is possible to preferentially make a user with a strong interest level or a high contribution level be involved in the communication. Meanwhile, if the transparency of a display object of a user whose stay time is shorter is set to a higher level, it is possible to avoid a circumstance where unnecessary display information about a user who is just passing by in front of the imaging device 104 by coincidence would strongly appear in the image. Note that the output image generation unit 170 can also use, instead of the stay time described herein, the time that has elapsed since the user had started to use the image processing system 1, for example.

FIG. 8B is an explanatory diagram illustrating another example of a transparency setting process of the output image generation unit 170. In the example of FIG. 8B, the output image generation unit 170 sets the transparency of a display object associated with a user in accordance with the moving speed of the user in the image.

The horizontal axis of FIG. 8B represents the time axis (time T), and the vertical axis represents the moving speed Mv indicated by a dashed line and the level of transparency Tr indicated by a solid line. In the example of FIG. 8B, the moving speed of a user who has just appeared in the image at time $T_0$ is $Mv_1$. At this time, the transparency Tr of the display object is 100%. After that, the moving speed of the user decreases from time $T_0$ to $T_2$, and the moving speed of the user increases after time $T_2$. The transparency Tr follows such a change in the moving speed Mv, and after decreasing from time $T_0$ to $T_2$, it increases again after time $T_2$.

Herein, it is considered that a user who has a strong interest in the communication provided by the image processing system 1 stays in front of the imaging device 104. Thus, if the transparency of a display object of a user whose moving speed is lower is set to a lower level, it is possible to preferentially make such a user be involved in the communication. In addition, it is also possible to avoid a circumstance where unnecessary display information about a user who is just passing by in front of the imaging device 104 by coincidence would strongly appear in the image. Note that the output image generation unit 170 can calculate the moving speed of the user from, for example, the movement amount of the position of the center of gravity of the face area between frames.

In addition, the output image generation unit 170 can also set the transparency of a display object in accordance with both the stay time and the moving speed of a user. For example, the output image generation unit 170 can, even when the moving speed of a user has increased, maintain the transparency of the display object of the user at a low level if the stay time of the user is greater than or equal to a predetermined threshold. Accordingly, it is possible to avoid a circumstance where a display object of a user becomes difficult to be viewed when the user temporarily moves within the image. Note that the output image generation unit 170 can also measure, for each user, the length of time of a pause state in which the moving speed is less than or equal to a predetermined threshold and the length of time of a moving state in which the moving speed is above the threshold, and then set the transparency of the display object in accordance with the ratio of the two time lengths.

In addition, the output image generation unit 170 can temporarily reduce the transparency of a display object of a user who made a predetermined gesture. For example, a hand-raising gesture, a handwaving gesture, or the like can be associated with a reduction in the transparency. Accordingly, it is possible to easily make a user, who has just appeared (i.e., whose stay time is short) but has a strong interest in the communication, be involved in the communication.

(8) Layer

The layer 188 in FIG. 5 represents the ordinal number of the display object for an order of the display objects that are overlaid on top of one another. In the example of FIG. 5, the layer of each of the display objects D01A and D02A is 1, the layer of the display object D01B is 2, and the layer of the display object D01C is 3. Thus, the output image generation unit 170 overlays the display objects such that the display objects D01A and D02A are placed at the foremost layer, the display object D01B is placed at the next layer, and the display object D01C is placed at the rearmost layer.

The output image generation unit 170 determines such layer of each display object on the basis of a parameter corresponding to the distance of each user from the imaging device 104. In this embodiment, a parameter corresponding to the distance of each user from the imaging device 104 can be the aforementioned size of a face area. However, the parameter is not limited thereto, and it is also possible to use as the parameter a distance measured with a ranging sensor, or the volume of a voice input via a microphone, for example. Then, the output image generation unit 170 sets the layer of a display object for displaying display information, which is associated with a user whose distance indicated by the parameter is shorter, to a lower value (i.e., arranges the display object on a more front side).

FIGS. 9A and 9B are explanatory diagrams each illustrating an example of a layer setting process.

Referring to FIG. 9A, three users Ua to Uc are located in front of the screen 107. The distances of the users Ua, Ub, and Uc from the screen 107 are D1, D2, and D3, respectively. Among them, the distance D1 is the shortest and the distance D3 is the longest. In such a circumstance, a face area of the user Ua being present in the input image is the largest. The size of a face area of the user Ub is the second largest, and the size of a face area of the user Uc is the smallest. In the example of FIG. 9A, the sizes of the face areas of the users Ua, Ub, and Uc are 1000 pixels, 800 pixels, and 400 pixels, respectively. Thus, the output image generation unit 170 sets the layer of a display object associated with the user Ua to 1, sets the layer of a display object associated with the user Ub to 2, and sets the layer of a display object associated with the user Uc to 3.

As described above, when a display object for a user whose face area is larger is overlaid on a more front side, it is possible to easily realize a natural display that matches a sense of distance even when the display objects are crowded. In addition, it is also possible to lead a user who wishes to be involved in communication to a position closer to the screen 107.

Further, the output image generation unit 170 can, for example, temporarily set the layer of a display object, which is associated with a user who is making a predetermined gesture or having a predetermined facial expression or with a user who is speaking, to a front side regardless of the distance of the user from the imaging device 104. The predetermined gesture herein can be, for example, a hand-raising gesture, a handwaving gesture, or the like. In addition, the predetermined facial expression herein can be a smile or the like. In the example of FIG. 9B, the layer of the user Uc who is making a handwaving gesture is temporarily set to 1 although the distance of the user Uc from the screen 107 is the longest. Such a process can provide expanded opportunities for a variety of users who wish to participate in communication to perform the communication while preventing only users who are located close to the screen 107 from being strongly involved in the communication.

[2-3. Example of Output Image]

FIG. 10 is an explanatory diagram showing an example of an output image output from the image processing device 100 in accordance with this embodiment. Referring to FIG. 10, an output image Im11 is shown as an example. Three users Ua, Ub, and Uc are present in the output image Im11. In addition, display objects 12a and 13a are overlaid on areas around the user Ua. A display object 12b is overlaid on an area around the user Ub. A display object 12c is overlaid on an area around the user Uc. However, as the users Ua, Ub, and Uc are located close to one another within the image, the display objects are crowded in an area surrounded by a dotted frame, and thus the display objects 13a, 12b, and 12c overlap one another.

A partial image Im12 shown at the lower right of FIG. 10 is an enlarged view of a partial image within the aforementioned dotted frame in the output image Im11. In the partial image Im12, the display object 13a is overlaid on the foremost side. In addition, the display object 12b is overlaid behind the display object 13a, and the display object 12c is overlaid behind the display object 12b. That is, it is understood that information about the user Ua who is actively involved in the communication in a position that is closest to the screen 107 is preferentially displayed in the output image Im11. In addition, the transparency of the display object 12c of the user Uc who is walking across from right to left in the image is set to a high level. Accordingly, it is possible to prevent information about the user Uc who is not involved in the communication with high possibility from hindering the visibility of the other information.

[2-4. Process Flow]

Figure 11:
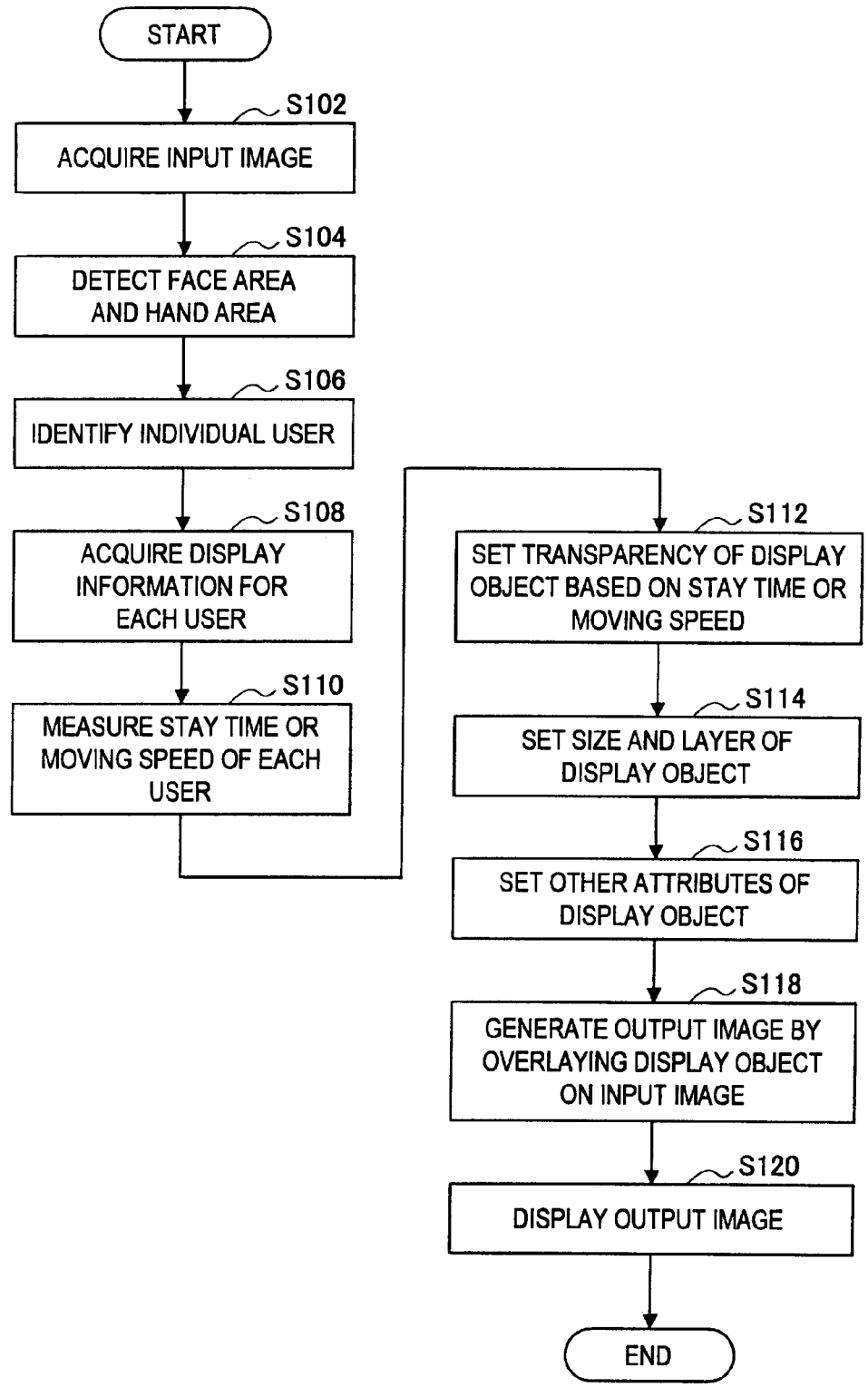
FIG. 11 is a flowchart showing an exemplary flow of the image processing in accordance with the first embodiment.

FIG. 11 is a flowchart showing an example of the main image processing flow of the image processing device 100 in accordance with the first embodiment.

Referring to FIG. 11, the image acquisition unit 110 first acquires an input image captured by the imaging device 104 (step S102). Then, the image acquisition unit 110 outputs the acquired input image to the recognition unit 130 and the output image generation unit 170.

Next, the recognition unit 130 detects face areas and hand areas of users that are present in the input image (step S104). Next, the recognition unit 130 identifies the individual user being present in the input image by checking the image feature quantity of each detected face area against the image feature quantity of a known user stored in the database 102 (step S106). In addition, the recognition unit 130 can identify the individual user by additionally using the voice feature quantity and the direction of a voice source that are detected from an input voice acquired by the voice acquisition unit 120.

Next, the information acquisition unit 150 acquires display information to be displayed in association with each user recognized by the recognition unit 130 from the database 102, the terminal device 105, an external information source, or the like (step S108).

Next, the output image generation unit 170 measures the stay time or moving speed of each user recognized by the recognition unit 130 in the image (step S110). Then, the output image generation unit 170, on the basis of the measured stay time or moving speed, sets the transparency of a display object for displaying the display information acquired by the information acquisition unit 150 (step S112). In addition, the output image generation unit 170 sets the size and layer of each display object using the size of the face area of each user as a parameter corresponding to the distance of the user from the imaging device 104 (step S114). Herein, the output image generation unit 170 can change the transparency or layer of each display object in accordance with a facial expression, gesture, or speaking state of the user recognized by the recognition unity 130. Further, the output image generation unit 170 sets the other attributes such as the display position and color of each display object (step S116).

Next, the output image generation unit 170 generates an output image by overlaying the display objects on the input image in accordance with the set attributes of the display objects (S118). Then, the output image generation unit 170 outputs the generated output image to the display device 106 to cause the display device 106 to display the output image (step S120).

[2-5. Conclusion of the First Embodiment]

The first embodiment of the present disclosure has been described above with reference to FIGS. 1 to 11. According to this embodiment, in a circumstance where pieces of information are crowded in an image of augmented reality where an output image is generated by overlaying information associated with each user on an input image, the arrangement of each display information in the depth direction is determined in accordance with the distance of each user from the imaging device. Accordingly, as a natural display that matches a sense of distance is realized, it is possible for users to easily understand which display information is related to which user. In addition, as a user who wishes to be involved in communication can be led to a position close to the screen, the communication is expected to be activated more.

In addition, according to this embodiment, the transparency of each display object is set in accordance with the stay time or moving speed of a user in an image. Accordingly, it is possible to present to a user information about a user who has a strong interest in the communication or a user who contributes to the communication to a high degree in a more visible way. In addition, it is also possible to prevent information about a user who is not involved in the communication from hindering the visibility of the other information. Further, according to this embodiment, the shape of each display object changes in accordance with the acquisition path of the display information or an input means used to input the information. Thus, the user is able to more intuitively and accurately understand the type of the display information.

3. Description of the Second Embodiment

In the aforementioned first embodiment, even when a plurality of pieces of display information overlap one another in a circumstance where the display pieces of information are crowded in an image, the information is presented in an understandable way. In the first embodiment, each display information is basically displayed in the default display position. In contrast, in the second embodiment described in this section, the display position of each display information is adaptively determined to suppress a reduction in the visibility that would occur if a plurality of pieces of display information overlap one another.

The configuration of a system in accordance with the second embodiment can be similar to the configuration of the image processing system 1 described with reference to FIG. 1.

[3-1. Exemplary Configuration of Image Processing Device]

Figure 12:
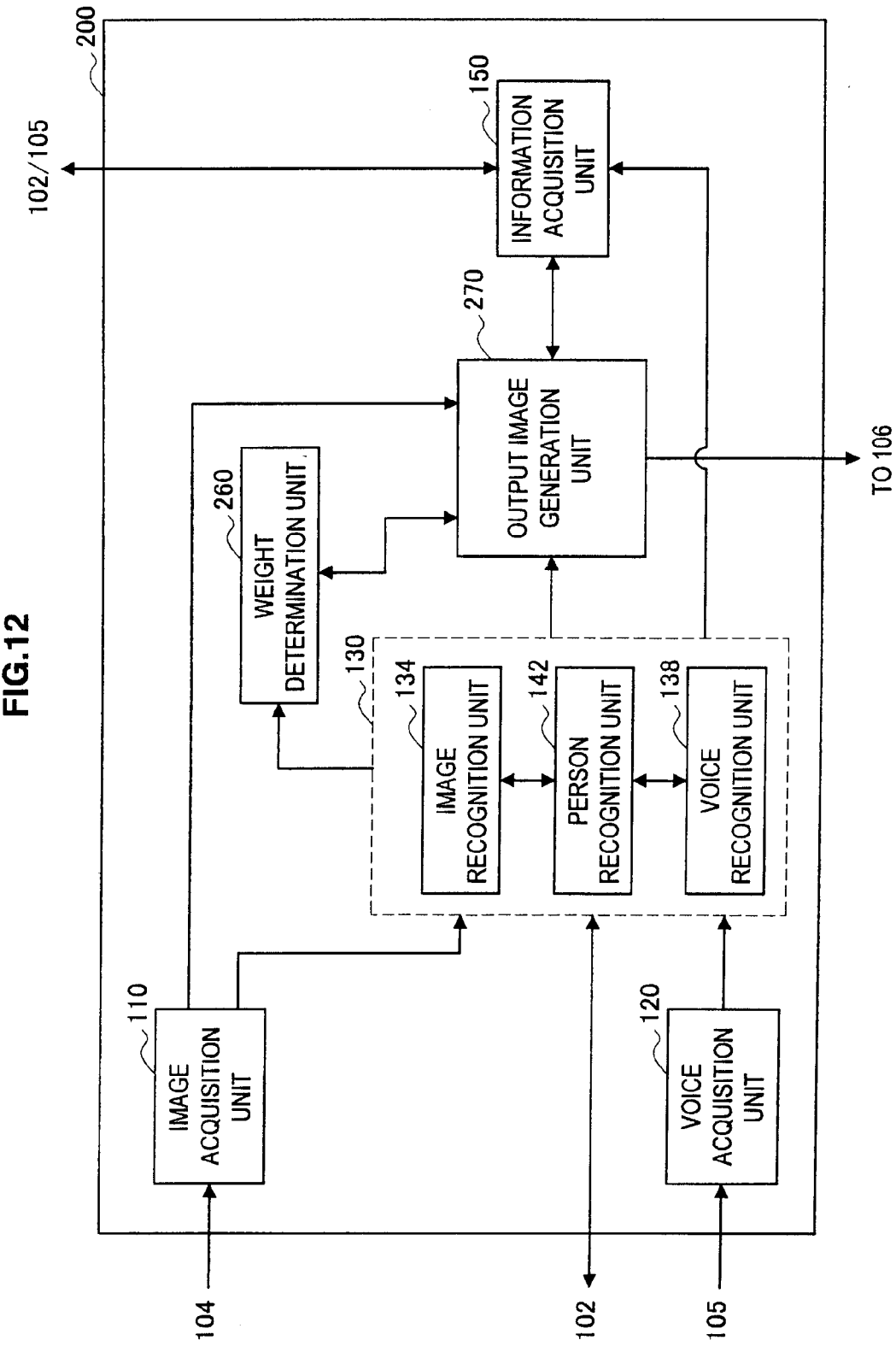
FIG. 12 is a block diagram showing an exemplary configuration of an image processing device in accordance with a second embodiment.

FIG. 12 is a block diagram showing an exemplary configuration of an image processing device 200 in accordance with the second embodiment of the present disclosure. Referring to FIG. 12, the image processing device 200 includes an image acquisition unit 110, a voice acquisition unit 120, a recognition unit 130, an information acquisition unit 150, a weight determination unit 260, and an output image generation unit 270. As with the image processing device 100 in accordance with the first embodiment, the recognition unit 130 includes an image recognition unit 134, a voice recognition unit 138, and a person recognition unit 142.

(Weight Determination Unit)

The weight determination unit 260 determines the weight of each user recognized by the recognition unit 130. In this embodiment, the term "weight" of a user refers to a concept that is similar to the priority of the user on the display, and display information for a user with a greater "weight" is preferentially arranged in a position close to the default display position. For example, the weight determination unit 260 can determine the weight of each user in accordance with the length of time for which the user is present in the input image, namely, the stay time. Alternatively, the weight determination unit 260 can determine the weight of each user using the attribute information of the user. More specifically, for example, the weight determination unit 260 can determine the weight of each user such that the weight of a user belonging to a particular sex (e.g., female) or a particular age group (e.g., children less than 10 years old or the elderly over 70 years old) becomes greater than the weights of other users.

FIG. 13 is an explanatory diagram illustrating an example of a weight determination process of the weight determination unit 260. The horizontal axis of FIG. 13 represents the time axis (time T), and the vertical axis represents the stay time St indicated by a dashed line and the magnitude of weight W indicated by a solid line. In the example of FIG. 13, the types of the weight W can be divided into the following three in accordance with the attributes of users: weight Wk for children (e.g., less than 10 years old), weight Wf for female, and weight Wm for male. When a user who had appeared in the image at time $T_0$ continuously stays in the image, the stay time St linearly increases along the time axis. The weight Wm increases linearly in proportion to the stay time St from time $T_0$ to $T_3$, and then becomes a constant value after time $T_3$. The weight Wf also increases linearly from time $T_0$ to $T_3$, and then becomes a constant value after time $T_3$. However, the weight Wf is greater than the weight Wm by dW over the entire time. The weight Wk increases linearly from time $T_0$ to $T_4$, and then becomes a constant value after time $T_4$. The weight Wk is greater than the weight Wf from time $T_0$ to $T_3$. The determination unit 260 stores a graph or calculation formula, for example, for calculating the weight in accordance with the stay time and attributes of each user in advance, and determines the weight of each user in accordance with the graph or calculation formula.

As described above, when the weight of a user with a particular attribute is set to a greater value than the weights of the other users, it is possible to preferentially treat a user who is expected to be actively involved in the communication or to draw attention to the user with the particular attribute. In addition, it is also possible to introduce into the system a thought that is respected in communication between the general public such as ladies first or priority for the elderly. Note that a user to be treated preferentially can be, for example, a member who pays a membership fee.

(Output Image Generation Unit)

The output image generation unit 270 generates an output image by overlaying the display information acquired by the information acquisition unit 150 on the input image input from the image acquisition unit 110. More specifically, the output image generation unit 270 first determines the attributes of a display object for displaying the display information acquired by the information acquisition unit 150. The attributes of the display object include data about the shape, color, size, display position, transparency, layer, and the like as in the example of FIG. 5. The way to determine the shape, color, size, transparency, or layer of the display object can be similar to that of the aforementioned first embodiment.

In this embodiment, the output image generation unit 270 determines the display position of the display information associated with each user (e.g., the display position of each display object) on the basis of the weight of each user determined by the weight determining unit 260. More specifically, for example, the output image generation unit 270 determines the display position of each display object so that a display object associated with a user with a greater weight is displaced from the default display position to a lesser degree. Then, the output image generation unit 270 generates an output image by overlaying each display object on the input image in the determined display position.

In this embodiment, a concept "attraction" that depends on the weight of a user and a displacement from the default display position is used in determining the display position. Further, in the first example of the display position determination process, a concept "repulsion" that depends on the distance between the default display position of the display information of a given user and the default display position of the display information of another user is also introduced.

(1) First Example of Display Position Determination Process

Figure 14A:
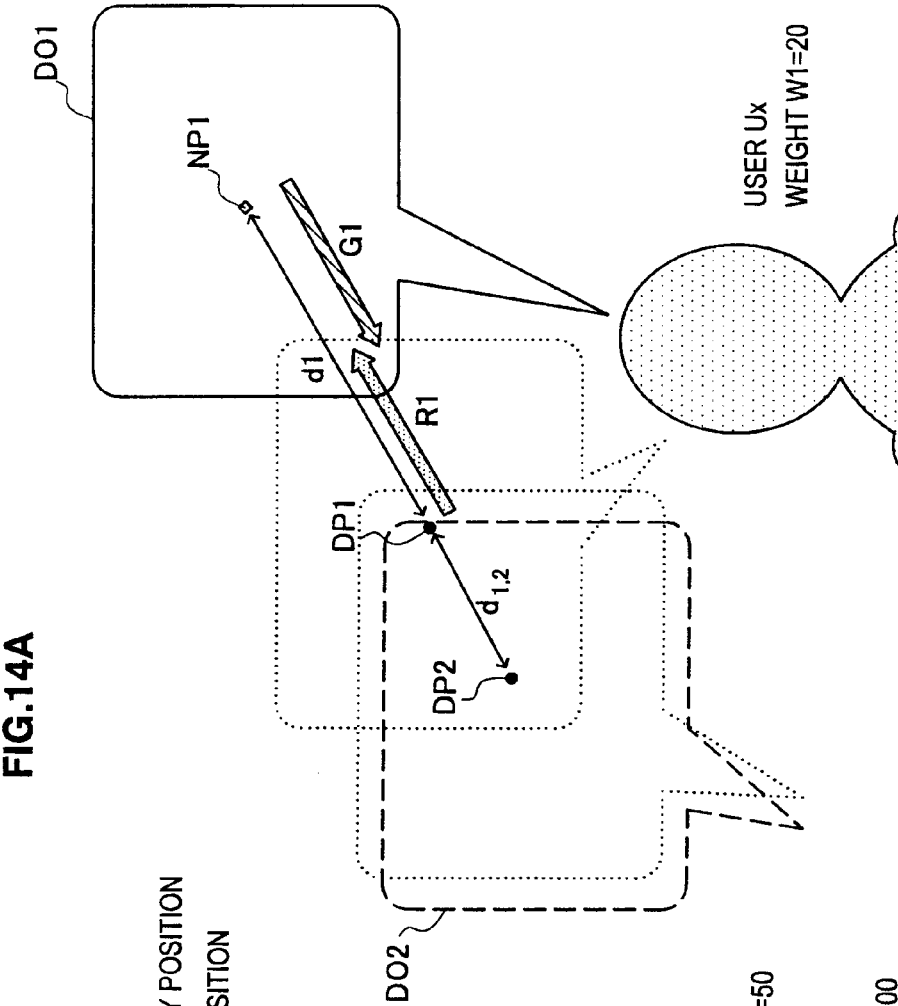
FIG. 14A is a first explanatory diagram illustrating a first example of a display position determination process.
Figure 14C:
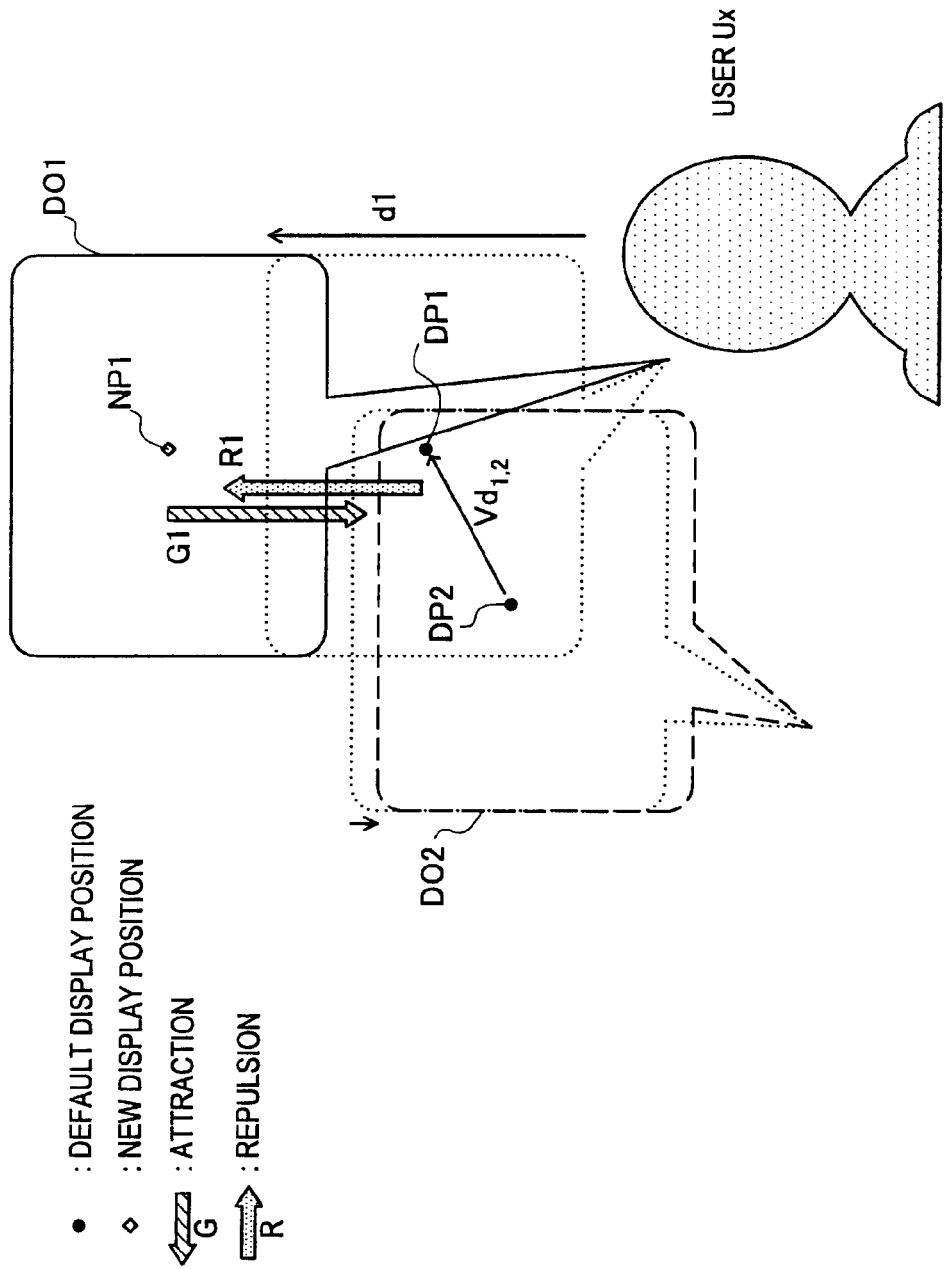
FIG. 14C is a third explanatory diagram illustrating the first example of the display position determination process.

FIGS. 14A to 14C are explanatory diagrams each illustrating the first example of the display position determination process of the output image generation unit 270. In the first example of the display position determination process, the output image generation unit 270 determines the display position of a display object for displaying each display information so that the aforementioned repulsion and attraction for each display information are in an equilibrium state.

Referring to FIG. 14A, a display object DO1 of a user Ux and a display object DO2 of another user are shown. As an example, the distance $d_{1,2}$ between the default display position DP1 of the display object DO1 and the default display position DP2 of the display object DP2 equals 120 (unit: pixels). In addition, the weight W1 of the user Ux equals 20.

Herein, repulsion R1 that acts on the display object DO1 is defined as, for example, the product of the distance $d_{1,2}$ and a predetermined constant C (hereinafter referred to as a repulsion constant, for example, C=50). Then, the repulsion $R1=d_{1,2}$ and $\times C=6000$. Meanwhile, attraction G1 that acts on the display object DO1 is defined as, for example, the product of the weight W1 of the user Ux and the displacement d1 of the display object DO1 from the default display position DP1. Then, in the state of equilibrium between the attraction G1 and the repulsion R1 (i.e., G1=R1), the displacement d1 of the display object DO1 is derived as follows: $d1=G1/W1=R1/W1=6000/20=300$. Thus, the output image generation unit 270 determines, on a straight line that connects the position DP1 and the position DP2, a position NP1 with a distance of 300 from the position DP1 (in a direction opposite to the position DP2) as a new display position of the display object DO1, for example. A new display position of the display object DO2 can be determined in a similar way.

Description has been made of a case in which two display objects overlap each other with reference to the example of FIG. 14A. In contrast, when three or more display objects overlap one another, the output image generation unit 270 can determine the display position of each display object by taking the resultant force of repulsions into consideration in a computation process.

Referring now to FIG. 14B, a display object DO1 of a user Ux and display objects DO2 and DO3 of another user are shown. Herein, a vector that starts at the default display position DP2 of the display object DO2 and ends at the default display position DP1 of the display object DO1 is indicated by $Vd_{1,2}$. In addition, a vector that starts at the default display position DP3 of the display object DO3 and ends at the default display position DP1 of the display object DO1 is indicated by $Vd_{1,3}$. Then, repulsion R1 that acts on the display object DO1 is represented by the sum of the vectors $C\times Vd_{1,2}$ and $C\times Vd_{1,3}$. In the equilibrium state, the attraction G1+the repulsion R1=0. Therefore, the output image generation unit 270 can calculate the displacement d1 of the display object DO1 from the default display position DP1 by dividing the repulsion R1 by the weight of the user Ux. Then, adding the displacement d1 to the default display position DP1 can determine the new display position NP1 of the display object DO1.

The examples of FIGS. 14A and 14B have been described on the assumption that the individual repulsion (before combined) acts along a straight line that connects the default display positions of the two display objects. Alternatively, the repulsion can be defined as acting only in a predetermined limited direction such as, for example, the vertical direction (in the image).

Referring now to FIG. 14C, a display object DO1 of a user Ux and a display object DO2 of another user are shown. Herein, a vector $Vd_{1,2}$ that starts at the default display position DP2 of the display object DO2 and ends at the default display position of DP1 of the display object DO1 points to the upper right. Note that in the example of FIG. 14C, repulsion is defined as acting only in the vertical direction. Consequently, the repulsion R1 acts along a straight line that extends upward from the position DP1. In this case, the displacement dl of the display object DO1 from the default display position DP1 also becomes a vector that does not point to the upper right but points straight upward. Consequently, the display object DO1 moves upward from the default display position. Likewise, the display object DO2 moves downward from the default display position. In this case, the relative positional relationship between each display object and the user does not change in the horizontal direction. Therefore, the user who views the output image is able to easily understand the correspondence between the display object and the user.

Although the repulsion herein is defined as the product of a repulsion constant and the distance between display objects, the repulsion is not limited thereto, and another definition of repulsion can be used. For example, the repulsion itself can be a constant, or the repulsion can be proportional to the square of the distance between display objects. Further, repulsion that would differ depending on the type of display information can be defined.

Alternatively, if the repulsion that corresponds to the distance between points (points that are closest to each other) on the outer circumferences of display objects is defined instead of using the distance between the default display positions of the display objects, it is also possible to eliminate the possibility that the display objects may partially overlap one another. As a further alternative, if a buffer area is provided around the outer circumference of each display object and the repulsion that corresponds to the distance between the rims of the buffer areas is defined, it is also possible to create a gap between the display objects. Furthermore, it is also possible to define the repulsion from the outer circumference (a window frame) of an output image and count the repulsion from the window frame into a formula that represents the state of equilibrium between the attraction and repulsion acting on the display object.

Description has been made above of an example in which a displacement of a display object is calculated using the definition of a so-called spring system that uses the product of the weight of a user and a displacement of the display object as the attraction. However, instead, it is also possible to use the definition of a mass-spring-damper system. In that case, a coefficient of acceleration (mass) and a coefficient of velocity (damping constant) of a display object can be given in accordance with the attributes of a user or the type of display information. Accordingly, it becomes possible to produce a visual effect such that display objects that have collided with each other sway along the time axis (and such sway will gradually cease).

(2) Second Example of Display Position Determination Process

Figure 15:
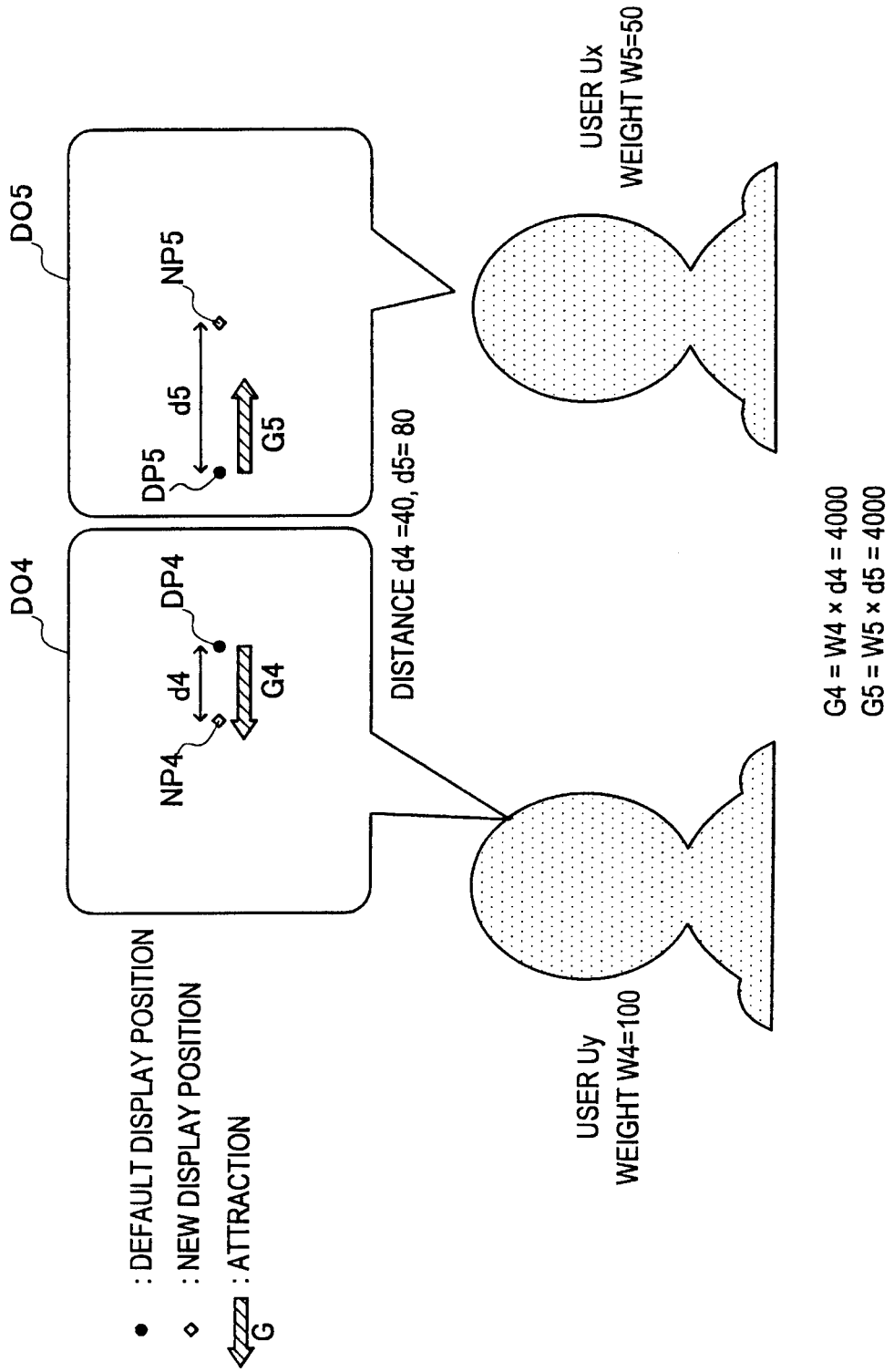
FIG. 15 is an explanatory diagram illustrating a second example of the display position determination process.

FIG. 15 is an explanatory diagram illustrating the second example of the display position determination process of the output image generation unit 270. In the second example of the display position determination process, the output image generation unit 270 determines the display positions of a plurality of display objects so that attractions that act on the plurality of display objects are in an equilibrium state. In this case, the aforementioned concept of repulsion is not used.

Referring to FIG. 15, a display object DO5 of a user Ux and a display object DO4 of a user Uy are shown. As an example, the distance d4 between the default display position DP4 and the new display position NP4 of the display object DO4 equals 40. Meanwhile, the distance d5 between the default display position DP5 and the new display position NP5 of the display object DO5 equals 80. In addition, the weight W5 of the user Ux equals 50, and the weight W4 of the user Uy equals 100. Herein, when the magnitude of the attraction is defined as the product of the weight of the user and the displacement of the display object from the default display position as in the first example of the display position determination process, attraction G4 that acts on the display object DO4 equals W4×d4=4000. Meanwhile, attraction G5 that acts on the display object DO5 equals W5×d5=4000. That is, the attraction G4 and the attraction G5 are in an equilibrium state in the new display positions. The output image generation unit 270 can, for example, search for display positions in which such an equilibrium state of attractions is reached for a plurality of display objects, and determine the display positions obtained as the search results as the display positions of the plurality of display objects. In this case also, a display object associated with a user with a greater weight is displaced from the default display position to a lesser degree as in the first example of the display position determination process.

(3) Restrictions on Display

Note that the output image generation unit 270 can, when the new display position of the display object determined through the aforementioned display position determination process does not meet the restrictions on the display, further change the display position of the display object or set the display position of the display object to the default display position. Examples of the restrictions on the display include the following: a display object should be within the screen, and a display object should not overlap a face of a user (e.g., all users or users whose weights are greater than or equal to a predetermined threshold). When a display object is overlaid on the default display position, for example, there is an increased possibility that a plurality of display objects may overlap one another. However, when a plurality of display objects overlap one another, the output image generation unit 270 controls the size, arrangement in the depth direction, transparency, or the like of the display information in accordance with the method described in the first embodiment. Thus, a reduction in the clarity of the display information can be reduced.

[3-2. Example of Output Image]

Figure 16:
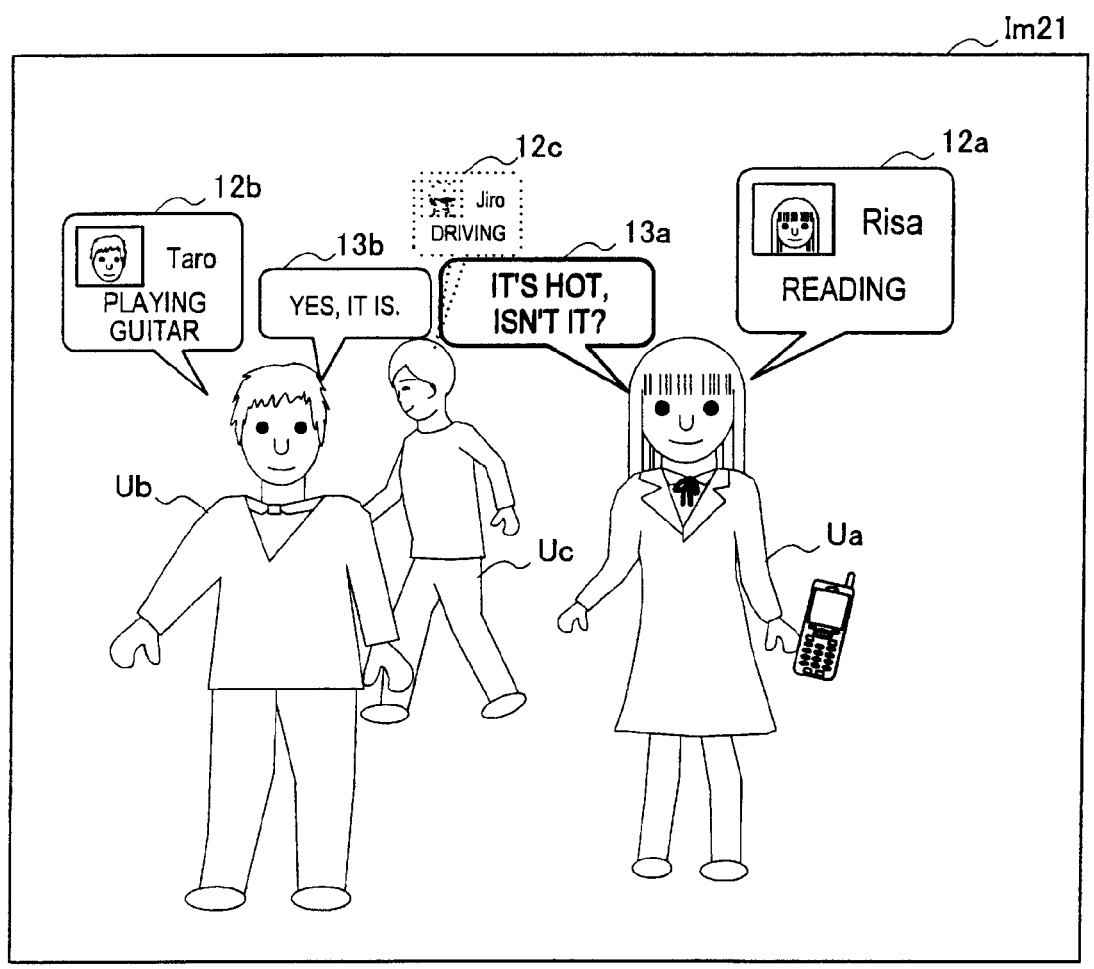
FIG. 16 is an explanatory diagram showing an example of an output image in accordance with the second embodiment.

FIG. 16 is an explanatory diagram showing an example of an output image output from the image processing device 200 in accordance with this embodiment. Referring to FIG. 16, an output image Im21 is shown as an example. Three users Ua, Ub, and Uc are present in the output image Im21. In the example of FIG. 16, the users Ua and Ub are present in the input image for a relatively long time, and are communicating with each other. Meanwhile, the user Uc is a user who is temporarily passing by.

Display objects 12a and 13a are overlaid on areas around the user Ua. Display objects 12b and 13b are overlaid on areas around the user Ub. A display object 12c associated with the user Uc is overlaid in a display position that is above and relatively far from the user Uc. These display objects do not overlap one another. Herein, in this embodiment, the positions of the display objects that overlap one another are moved from their default display positions so that a display object associated with a user with a greater weight is displaced from its default display position to a lesser degree as described above. Therefore, the display objects 13a and 13b of the users Ua and Ub whose stay time is long and whose weights are large have not moved from their default display positions much. In contrast, the display object 12c of the user Uc whose stay time is short and whose weight is smaller has moved upward to avoid the display objects 13a and 13b. Accordingly, communication between the users Ua and Ub can be smoothly continued without being interrupted by the display object of the user Uc who is temporarily passing by. In addition, the user is able to easily understand which user is continuously using the system to what extent.

[3-3. Process Flow]

Figure 17:
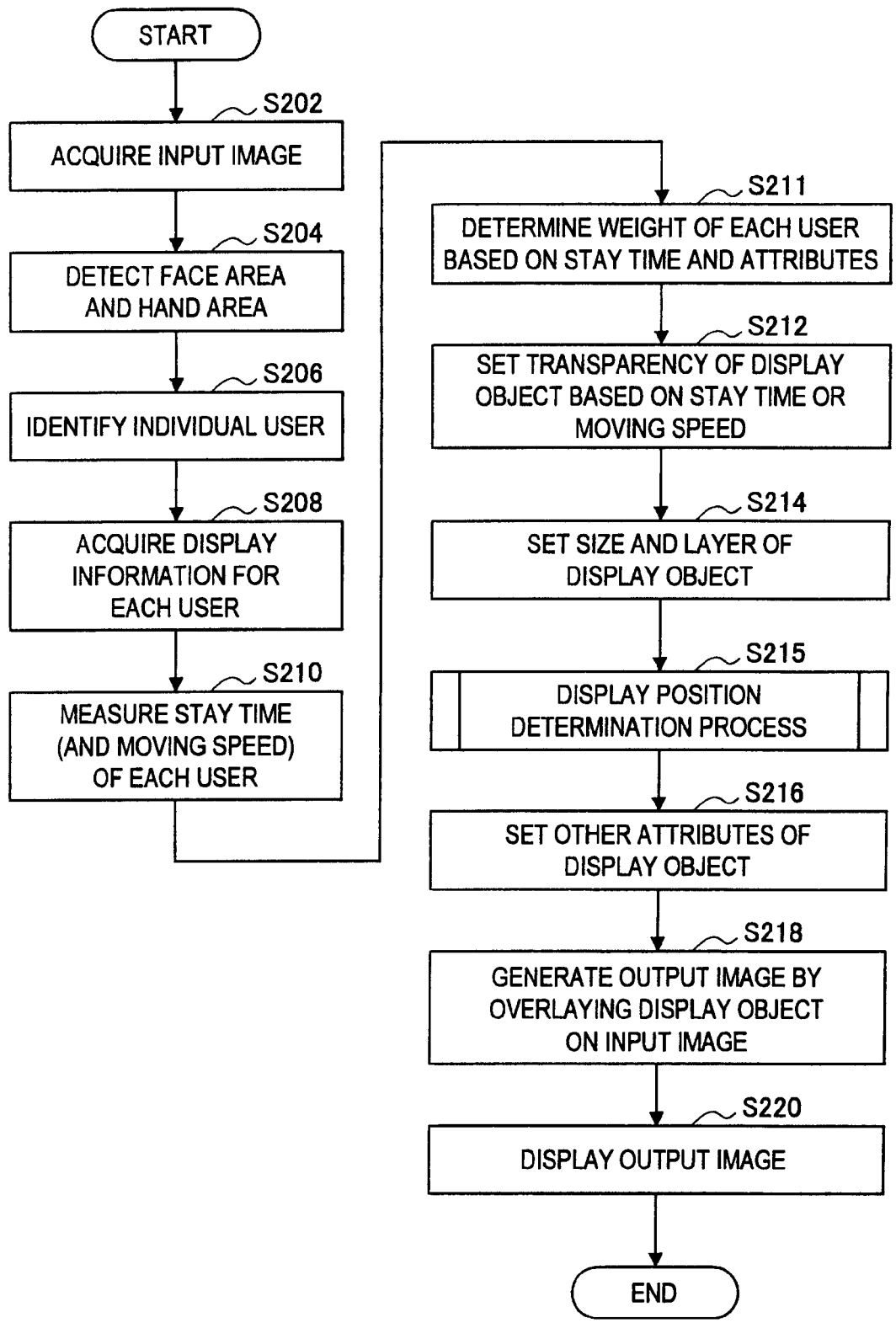
FIG. 17 is a flowchart showing an exemplary flow of the image processing in accordance with the second embodiment.

FIG. 17 is a flowchart showing an example of the main image processing flow of the image processing device 200 in accordance with this embodiment.

Referring to FIG. 17, the image acquisition unit 110 first acquires an input image captured by the imaging device 104 (step S202). Then, the image acquisition unit 110 outputs the acquired input image to the recognition unit 130 and the output image generation unit 270.

Next, the recognition unit 130 detects face areas and hand areas of users that are present in the input image (step S204). Next, the recognition unit 130 identifies the individual user being present in the input image by checking the image feature quantity of each detected face area against the image feature quantity of a known user stored in the database 102 (step S206).

Next, the information acquisition unit 150 acquires display information to be displayed in association with each user recognized by the recognition unit 130 from the database 102, the terminal device 105, an external information source, or the like (step S208).

Next, the output image generation unit 270 measures the stay time (and the moving speed as needed) of each user recognized by the recognition unit 130 in the image (step S210). Then, the weight determining unit 260 determines the weight of each user on the basis of the stay time of each user measured by the output image generation unit 270 and the attribute information of each user (step S211).

Next, the output image generation unit 270, on the basis of the stay time or moving speed, sets the transparency of a display object for displaying the display information acquired by the information acquisition unit 150 (step S212). In addition, the output image generation unit 270 sets the size and layer of each display object using the size of the face area of each user as a parameter corresponding to the distance of the user from the imaging device 104 (step S214).

Next, the output image generation unit 270 performs the display position determination process, which is described in detail below, to determine the display position of each display object (step S215). In addition, the output image generation unit 270 sets the other attributes such as the color of each display object (step S216).

Next, the output image generation unit 270 generates an output image by overlaying the display objects on the input image in accordance with the set attributes of the display objects (step S218). Then, the output image generation unit 270 outputs the generated output image to the display device 106 to cause the display device 106 to display the output image (step S220).

Figure 18:
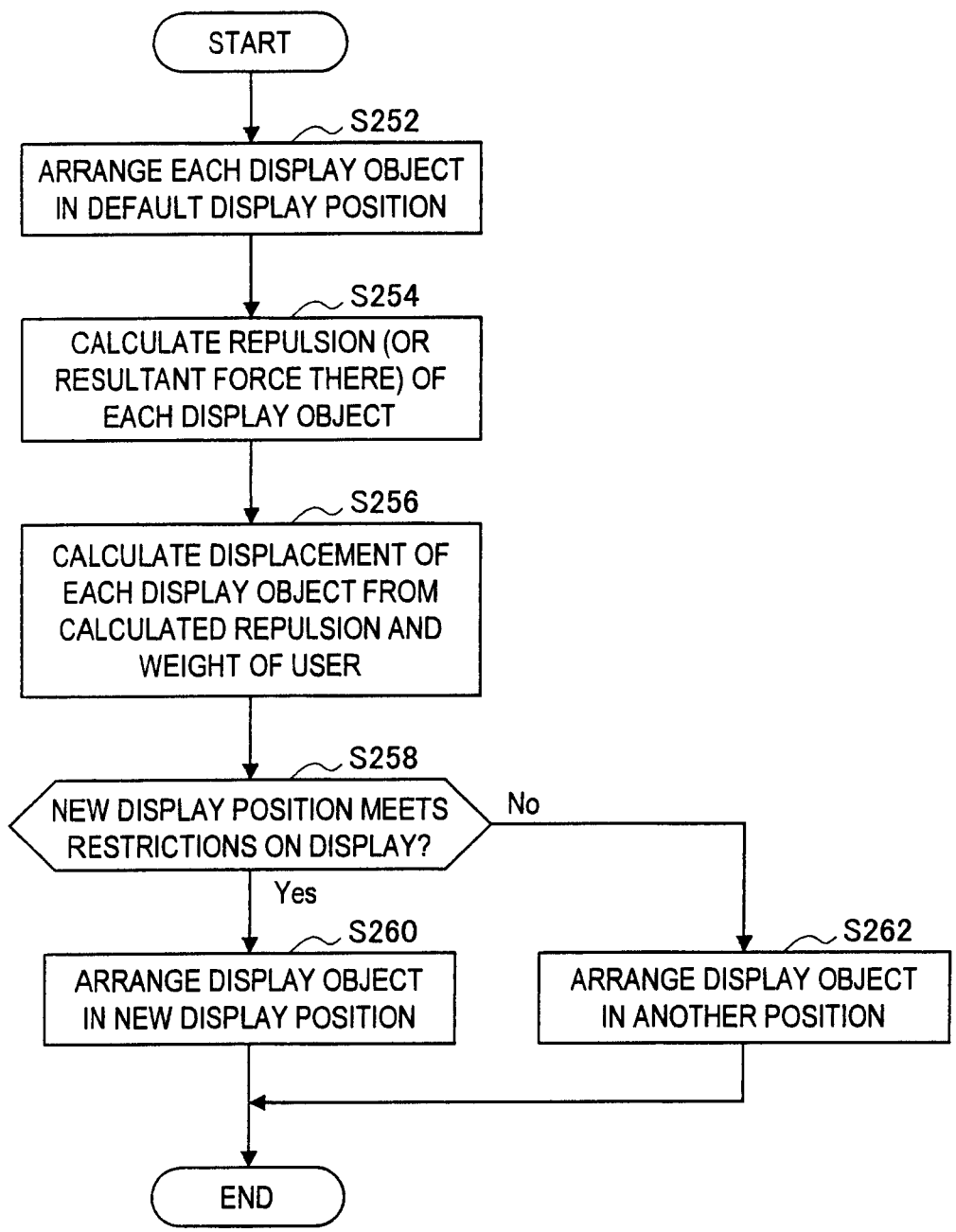
FIG. 18 is a flowchart showing a first exemplary flow of the display position determination process in accordance with the second embodiment.

FIG. 18 is a flowchart showing an exemplary flow of the display position determination process corresponding to step S215 of FIG. 17. The flowchart in FIG. 18 corresponds to the first example of the display position determination process described with reference to FIGS. 14A to 14C.

Referring to FIG. 18, the output image generation unit 270 first arranges each display object in its default display position (step S252). Next, the output image generation unit 270 calculates the repulsion (or the resultant force of a plurality of repulsions) acting on each display object in accordance with the distance between the default display positions (step S254). Next, the output image generation unit 270 calculates the displacement of each display object from its default display position on the basis of the calculated repulsion and the weight of the user (step S256).

Next, the output image generation unit 270 determines if a new display position of each display object that is derived by adding the calculated displacement to the default display position meets the restrictions on the display (step S258). Herein, if the new display position is determined to meet the restrictions on the display, the output image generation unit 270 arranges the display object in the new display position (step S260). Meanwhile, if the new display position is not determined to meet the restrictions on the display, the output image generation unit 270 arranges the display object in another position including the default display position (step S262).

Figure 19:
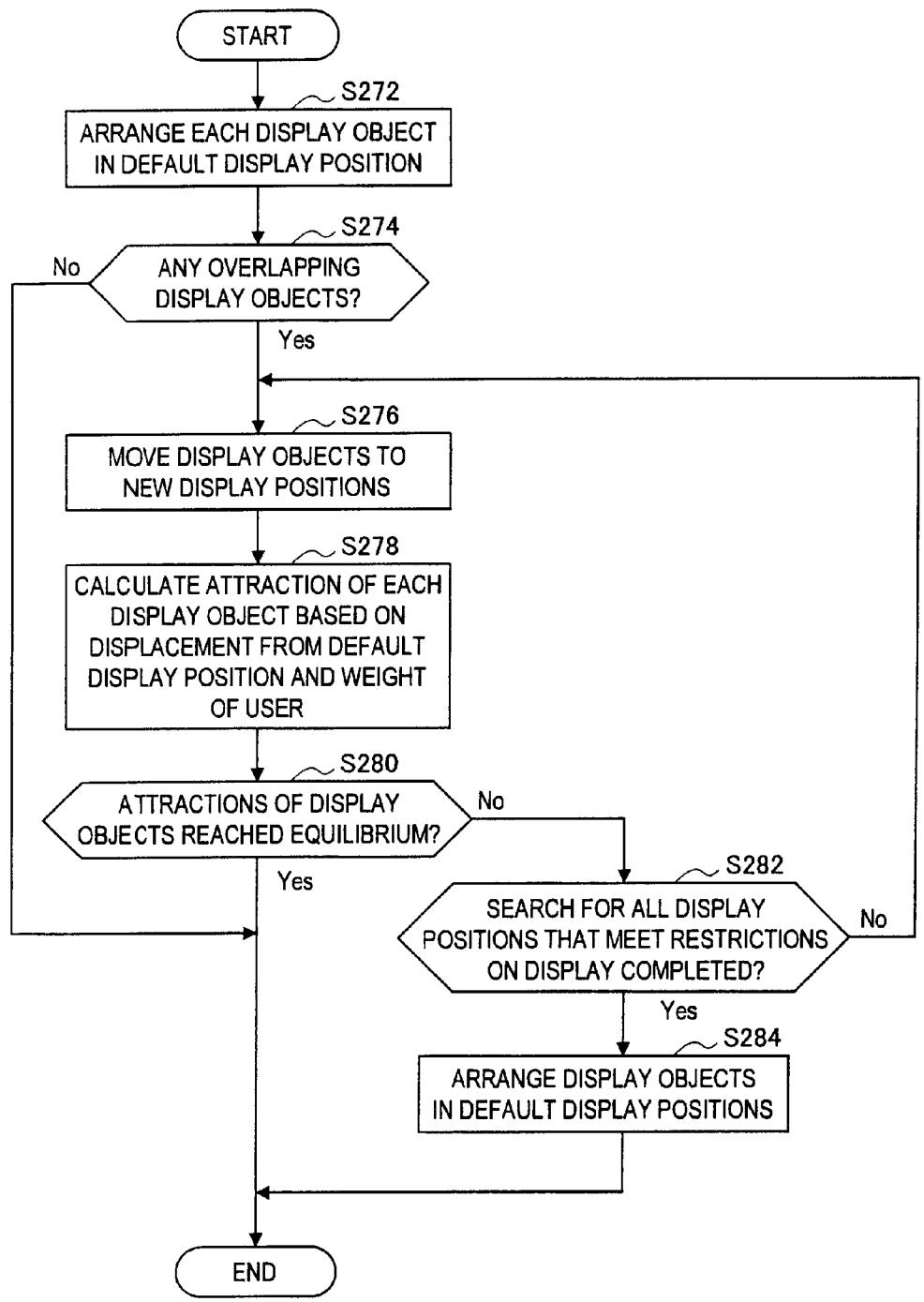
FIG. 19 is a flowchart showing a second exemplary flow of the display position determination process in accordance with the second embodiment.

FIG. 19 is a flowchart showing another exemplary flow of the display position determination process corresponding to step S215 of FIG. 17. The flowchart in FIG. 19 corresponds to the second example of the display position determination process described with reference to FIG. 15.

Referring to FIG. 19, the output image generation unit 270 first arranges each display object in its default display position (step S272). Next, the output image generation unit 270 determines if there are any display objects that overlap one another (step S274). Herein, if there are no overlapping display objects, the display position determination process of the output image generation unit 270 terminates. Meanwhile, if there are overlapping display objects, the process proceeds to step S276.

In step S276, the output image generation unit 270 moves the display objects that have been determined to overlap one another in step 274 to new display positions (step S276). Next, the output image generation unit 270 calculates the attraction of each display object on the basis of the displacement from the default display position and the weight of the user (step S278). Then, the output image generation unit 270 determines if the calculated attractions of the display objects have reached an equilibrium state (step S280). Herein, if the attractions of the display objects are determined to have reached an equilibrium state, the display position determination process of the output image generation unit 270 terminates. Meanwhile, if the attractions of the display objects are not determined to have reached an equilibrium state, the process proceeds to step S282.

In step S282, the output image generation unit 270 determines if all display positions that meet the restrictions on the display have already been searched for (step S282). Herein, if there remain any display positions that have not been searched for yet, the process returns to step S276. Meanwhile, if all display positions that meet the restrictions on the display have already been searched for, the output image generation unit 270 arranges the display objects in their default display positions again regardless of the overlap of the display objects, for example (step S284), and then terminates the process.

[3-4. Conclusion of the Second Embodiment]

The second embodiment of the present disclosure has been described above with reference to FIGS. 12 to 19. According to this embodiment, the weight of a user, which is similar to the priority of the user on the display, is determined in accordance with the stay time or attribute information of the user, for example. The display position of display information associated with each user is determined on the basis of the weight. Accordingly, it is possible to avoid a plurality of pieces of display information from overlapping one another so that display information of a user with high priority is not hindered or interfered with by display information of other users. Consequently, it is possible to, in a circumstance where pieces of information are crowded in an image of augmented reality, display information in a more understandable way.

In addition, according to this embodiment, the dispiay position of each display information is determined so that display information associated with a user with a greater weight is displaced from its default display position to a lesser degree. Accordingly, it is possible to reduce the risk that display information of a user who temporarily appears in an image may interrupt communication between users who have been continuously using the system in accordance with this embodiment. In addition, it is also possible to motivate a user to use the system for a longer time, Meanwhile, if a display position determined on the basis of the weight does not meet the restrictions on the display, then the size, arrangement in the depth directon, transparency, or the like of the display information is controlled as in the first embodiment, so that a plurality of pieces of display information is controlled as in the first overlap one another. According. According, even when pieces of information are crowded in an image of augmented reality, a signification reduction in the clarity of the information will not occur.

Note that a series of the processes in accordance with the first and second embodiments described in this specification is typically implemented using software. A program that constitutes the software for implementing the series of the processes is stored in, for example, a storage medium provided in or outside each device in advance. In addition, each program is read into RAM (Random Access Memory) when executed and executed by a processor such as a CPU (Central Processing Unit).

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The present disclosure contains subject matter related to that disclosed in Japanese Priority Patent Application JP 2010-198987 filed in the Japan Patent Office on Sep. 6, 2010, the entire content of which is hereby incorporated by reference.

What is claimed is:

1. An image processing device, comprising:
   a recognition unit configured to recognize a plurality of registered users present in an input image captured by an imaging device;
   an information acquisition unit configured to acquire display information to be displayed in association with each registered user of the plurality of registered users recognized by the recognition unit; and
   an output image generation unit configured to generate an output image by overlaying the display information acquired by the information acquisition unit on the input image,
   wherein the output image generation unit overlays first display information associated with a first registered user on a front side of second display information associated with a second registered user if a distance of the first registered user from the imaging device is shorter than a distance of the second registered user from the imaging device,
   wherein the recognition unit further recognizes a gesture of the second registered user, and
   wherein the output image generation unit temporarily moves the display information of the second registered user to a front side of the display information of the first registered user based on the recognition if the gesture.

2. The image processing device according to claim 1, wherein the output image generation unit sets a transparency of each piece of the display information overlaid on each other.

3. The image processing device according to claim 1, wherein
   the recognition unit further recognizes a size of a face area of each registered user present on the input image, and
   the output image generation unit uses the size of the face area of each registered user to determine the distance of each of the first registered user and the second registered user.

4. The image processing device according to claim 2, wherein
   the output image generation unit measures a length of time for which each registered user recognized by the recognition unit is present in the input image or a moving speed of each registered user, and
   the output image generation unit sets the transparency of the display information in accordance with the length of time or the moving speed measured for each registered user associated with the display information.

5. The image processing device according to claim 4, wherein the output image generation unit sets the transparency of the display information of the plurality of registered users present in the input image for a longer time to a lower level.

6. The image processing device according to claim 4, wherein the output image generation unit sets the transparency of the display information of a registered user whose moving speed is lower to a lower level.

7. The image processing device according to claim 4, wherein
   the recognition unit further recognizes a gesture of each registered user, and
   the output image generation unit temporarily reduces the transparency of the display information of a registered user who has made a predetermined gesture.

8. The image processing device according to claim 1, wherein
   the recognition unit further recognizes a facial expression or a speaking state of each registered user, and
   the output image generation unit temporarily displays display information associated with a registered user who is having a predetermined facial expression or with a registered user who is speaking on the front side regardless of the distance of the registered user from the imaging device.

9. The image processing device according to claim 1 wherein the output image generation unit determines a display size of the display information associated with each registered user in accordance with the distance of each registered user from the imaging device.

10. The image processing device according to claim 1, wherein
the information acquisition unit acquires text input via a text input device as first type display information and acquires a voice input via a voice input device as second type display information, and
the output image generation unit sets a shape of a first object for displaying the first type display information to a first shape representing a thought, and sets a shape of a second object for displaying the second type display information to a second shape representing a speech.

11. The image processing device according to claim 1, wherein
the information acquisition unit acquires information input via a text input device or a voice input device as the display information,
the output image generation unit analyzes the display information acquired by the information acquisition unit to determine whether the display information is third type display information corresponding to a thought of a registered user or fourth type display information corresponding to a speech of the registered user, and
the output image generation unit sets a shape of a third object for displaying the third type display information to a third shape representing the thought, and sets a shape of fourth object for displaying the fourth type display information to a fourth shape representing the speech.

12. The image processing device according to claim 1, wherein
the information acquisition unit acquires information input by a registered user as fifth type display information, and acquires information acquired from an external information source based on information input by the registered user or attribute information of the registered user as sixth type display information, and
the output image generation unit displays the fifth type display information and the sixth type display information using objects with different shapes.

13. A non-transitory, computer-readable medium having stored thereon, computer-executable instructions, which when executed by processor, cause an image processing device to execute operations, the operations comprising:
recognizing, by a recognition unit, a plurality of registered users present in an input image captured by an imaging device;
acquiring, by an information acquisition unit, display information to be displayed in association with each registered user of the plurality of registered users recognized by the recognition unit; and
generating, by an output image generation unit, an output image by overlaying the display information acquired by the information acquisition unit on the input image,
wherein the output image generation unit overlays first display information associated with a first registered user on a front side of second display information associated with a second registered user if a distance of the first registered user from the imaging device is shorter than a distance of the second registered user from the imaging device,
wherein the recognition unit further recognizes a gesture of the second registered user, and wherein the output image generation unit temporarily moves the display information of the second registered user to a front side the display information of the first registered user based on the recognition of the gesture.

14. The non-transitory, computer-readable medium according to claim 13, wherein the output image generation unit sets a transparency of each piece of the display information overlaid on each other.

15. The non-transitory, computer-readable medium according to claim 13, wherein
the recognition unit further recognizes a size of a face area of each registered user being present in the input image, and
the output image generation unit uses the size of the face area if each registered user to determine the distance of each of the first registered user and the second registered user.

16. The non-transitory, computer-readable medium according to claim 14, wherein
the output image generation unit measures a length of time for which each registered user recognized by the recognition unit is present in the input image or a moving speed of each registered user, and
the output image generation unit sets the transparency of the display information in accordance with the length of time or the moving speed measured for the registered user associated with the display information.

17. The non-transitory, computer-readable medium storing a program according to claim 16, wherein the output image generation unit sets the transparency of the display information of a registered user who is present, in the input image for a longer time to a lower level.

18. The non-transitory, computer-readable medium storing a program according to claim 16, wherein the output image generation unit sets the transparency of the display information of a registered user whose moving speed is lower to a lower level.

19. An image processing method, comprising:
recognizing a plurality of registered users present in an input image captured by an imaging device:
acquiring display information to be displayed in association with each recognized registered user of the plurality of registered users;
determining which of first display information associated with a first registered user and second display information associated with a second registered user is to be overlaid on a front side based on a parameter corresponding to a distance of each registered user from the imaging device;
generating an output image by overlaying the acquired display information on the input image;
overlaying the first display information associated with the first registered user on a front side of the second display information associated with the second registered user if the distance of the first registered user from the imaging devise is shorter than a distance of the second registered user from the imaging device;
recognizing a gesture of the second registered user; and
temporarily moving the display information of the second registered user to a front side of the display information of the first registered user based on the recognition of the gesture.

20. The image processing method according to claim 19, further comprising:

setting a transparency of each piece of the display information overlaid on each other.

* * * * *